(12) United States Patent
Bove, Jr. et al.

(10) Patent No.: US 12,405,718 B2
(45) Date of Patent: Sep. 2, 2025

(54) EFFICIENT VIDEO PLAYER NAVIGATION

(71) Applicant: Adeia Guides Inc., San Jose, CA (US)

(72) Inventors: V. Michael Bove, Jr., Wrentham, MA (US); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/750,916

(22) Filed: May 23, 2022

(65) Prior Publication Data

US 2023/0376189 A1 Nov. 23, 2023

(51) Int. Cl.
*G06F 3/04847* (2022.01)
*G11B 27/34* (2006.01)

(52) U.S. Cl.
CPC .......... *G06F 3/04847* (2013.01); *G11B 27/34* (2013.01)

(58) Field of Classification Search
CPC ............................ G06F 3/04847; G11B 27/34
See application file for complete search history.

(56) References Cited

U.S. PATENT DOCUMENTS

| | | | | |
|---|---|---|---|---|
| 10,528,818 B1* | 1/2020 | Rao | ......................... | G06V 20/40 |
| 2002/0109728 A1* | 8/2002 | Tiongson | ............ | G06F 3/04855 |
| | | | | 715/786 |
| 2012/0017152 A1* | 1/2012 | Matsuda | ................ | G11B 27/34 |
| | | | | 715/723 |
| 2013/0332836 A1* | 12/2013 | Cho | ........................ | G11B 27/34 |
| | | | | 715/723 |
| 2014/0270708 A1* | 9/2014 | Girgensohn | ..... | H04N 21/44008 |
| | | | | 386/282 |
| 2015/0346984 A1* | 12/2015 | Flint | .................... | G11B 27/102 |
| | | | | 715/720 |
| 2017/0110156 A1* | 4/2017 | Markan | ............... | G06F 3/04883 |
| 2017/0139578 A1 | 5/2017 | Dickerson et al. | | |

FOREIGN PATENT DOCUMENTS

EP 2618249 A2 7/2013

* cited by examiner

*Primary Examiner* — Jennifer N Welch
*Assistant Examiner* — Amy P Hoang
(74) *Attorney, Agent, or Firm* — HALEY GUILIANO LLP

(57) ABSTRACT

Systems and method for displaying two navigation bars to navigate a video asset, where the first navigation bar provides navigation to a predetermined point and the second navigation bar allows a frame-by-frame navigation are described. The methods determine the time span, coverage of scene and chapters, and display formats of the second navigation bar. The time span of the second navigation bar may be configured to include frames of a desired scene or chapter such that the initial frame and the last frame of the scene are included for frame-by-frame navigation. The time span may also cover scene or chapter that are non-consecutive to the current play position such that multiple non-consecutive chapters can be navigated within the same second navigation bar. Functionality that includes annotating, editing, transmitting, on a per frame level is provided through the second navigation bar.

24 Claims, 13 Drawing Sheets

EFFICIENT VIDEO PLAYER NAVIGATION

FIELD OF INVENTION

Embodiments of the present disclosure relate to navigation bars for performing frame-level searches in video.

BACKGROUND

Navigating videos using progress bars is a common technique used to scroll to a desired position in the video. Several on-demand video platforms, such as Netflix®, YouTube®, Amazon Prime® include progress bars that are displayed at the bottom of the user interface that allows the user to scroll through the displayed video along its timeline. Although scrolling the video makes it easier for the user to fast-forward or rewind to reach a desired play position in the video, the progress bar and its functionality is limited.

Using current versions of the progress bars, a user is able to scroll across the video timelines based on predetermined jump points. For example, if the video is fast-forwarded using the progress bar, the scrolling will jump from one predetermined point in the video to the next predetermined point while skipping one or more frames that are in-between the two predetermined jump points. As such, only a coarse level of scrolling is capable based on the current methods.

Yet another limitation with the current progress bar is that it does not allow further refinement or focusing in on a coarse search performed by using the progress bar is used. Some attempts have been made to refine a search, such as in U.S. Patent Application US2017/0139578A1, however, such attempts also fall short. For example, the above-mentioned patent discloses having a navigation bar and a graphical indicator. The graphical indicator is used for viewing a 3D object from a plurality of viewing directions within the 360-degree video and does not solve the coarse level of scrolling issue identified above.

As such, there is a need for a better method of navigation such that provides the capability to perform granular frame-by-frame navigation of a video.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
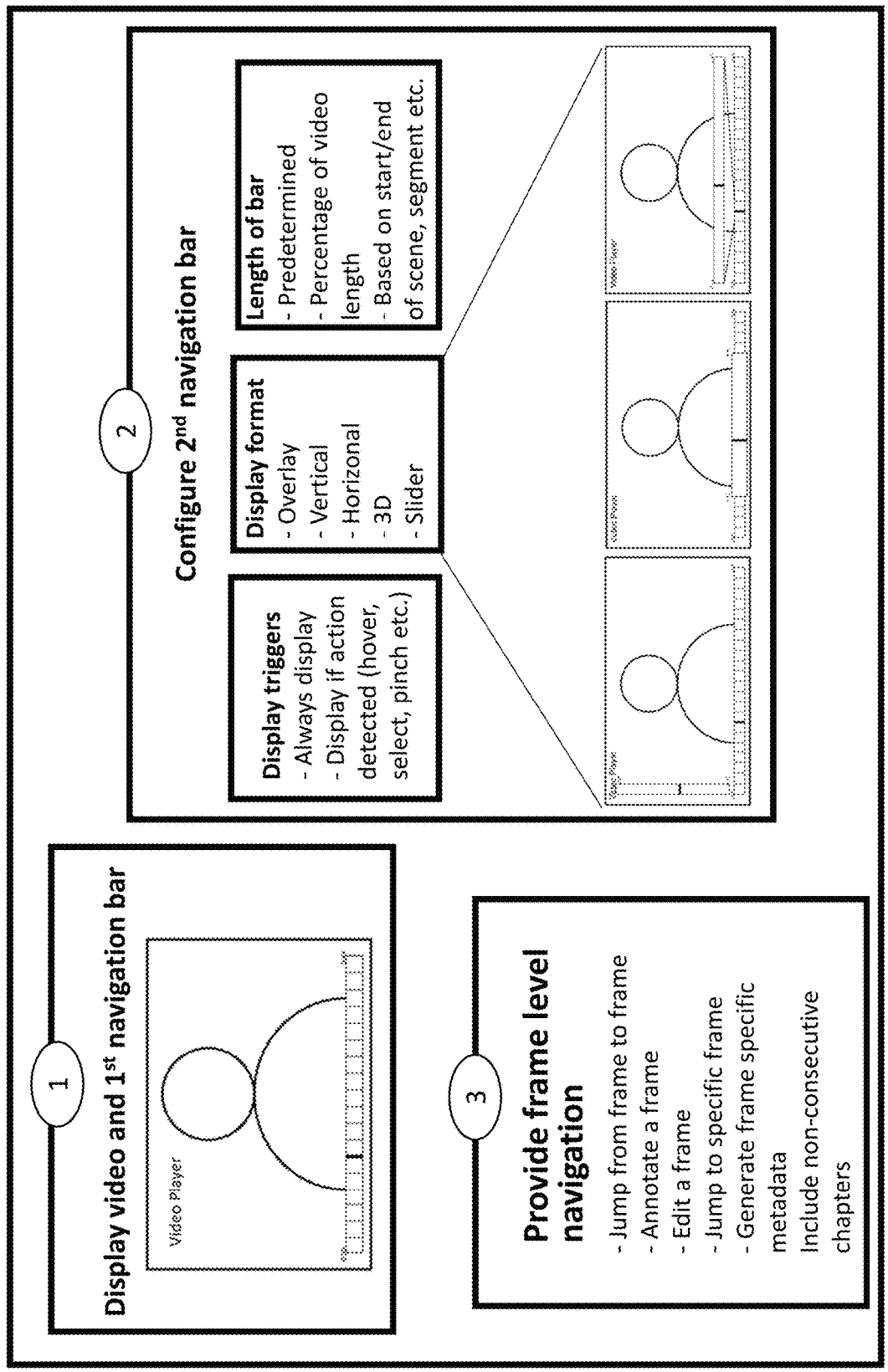
FIG. 1 is a block diagram of an example of a process for generating a second navigation bar, in accordance with some embodiments of the disclosure.

In accordance with some embodiments disclosed herein, some of the above-mentioned limitations are overcome by generating a second navigation bar, in addition to the first or progress navigation bar, that allows granular frame-by-frame navigation over a shorter time interval thereby allowing a user to advance to a desired point in the video with a single frame accuracy or perform other functions, such as edit, annotate, transmit, a targeted frame.

In one embodiment a first navigation bar is displayed during the playing of a video asset. The first navigation bar, which is also referred to as the progress bar, allows a user to scroll or jump to predetermined points in the video timeline (consistent time intervals, or content-related points such as chapters or scenes).

When a user has navigated to a predetermined point using the first navigation bat, a second bar is displayed. The second navigation bar has a shorter span than the first navigation bar, such as a span that covers some length of the video timeline between the two predetermined jump points of the first navigation bar, or preceding or succeeding any predetermined jump point, also referred to as a temporal point. Having a shorter time interval that is substantially shorter that the first navigation bar allows the second navigation bar to provide a granular and frame-accurate navigation through the shorter time interval such that a user can navigate on a frame-by-frame basis without fast-forwarding or rewinding too much to miss a desired frame.

In one embodiment, the second navigation bar may be configured to cover various chapters of the video and also for its display format, duration, and its ON/OFF triggers. In regard to chapters to be covered, the second navigation bar's time interval may be configured to cover frames at a current play position or at a current play position as well as a selected play position that may be in a consecutive or a non-consecutive chapter in the video. This includes having a time interval that may start before, at, or after the temporal point of the current play position to span a desired length of time. It may also include obtaining frames from another chapter that is not currently being played, such as a consecutive or a non-consecutive chapter, and displaying frames of both the current play position and its surroundings as well as the selected consecutive or a non-consecutive chapter within the same second navigation bar.

In some embodiments, the display format of the second navigation bar may be configured in as an overlay on the first navigation bar, as a slider on the first navigation bar, in a horizontal or vertical format adjacent to the first navigation bar, a 90-degree angle from the first navigation bar, or displayed at a different depth that the first navigation bar in a 3D space.

In some embodiments, the duration of the second navigation bar may be configured based on the overall video timeline. For example, it may be a percentage, or some other value based on the overall video timeline. The duration may also be configured based on the scene, segment, chapter, or dialogues. For example, each second navigation bar may be configured to cover frames related to a scene, segment, chapter, or dialogue from its start to end. The duration of the second navigation bar may also be configured to cover multiple chapters within the same second navigation bar.

In some embodiments, the ON/OFF triggers for the second navigation bar may be configured such that the second navigation bar is displayed at all times during the playing of the video. In other embodiments, the second navigation bar may be configured to be displayed in response to detecting an action, such as a selection, touch, hovering, eye gaze etc.

FIG. 1 is a block diagram of an example of a process for generating a second navigation bar, in accordance with some embodiments of the disclosure. The generated second navigation bar provides frame-accurate granular level navigation, i.e., on a frame-by-frame basis, through a shorter time interval thereby allowing various post processing functions, such as editing, annotating, and combining frames from different chapters etc.

At block 1, a video is displayed on a video player having a display, such as a television, laptop, mobile phone, tablet, or any other media device. In one embodiment, a first navigation bar may be displayed at all times during the playing of the video. In another embodiment, the first navigation bar may appear in response to detecting some interaction, such as movement of an associated remote-control device, selection or hovering over the display, such as from a cursor.

The first navigation may have a plurality of predetermined points, also referred to as jump points, or marker, in the video timeline. A coarse or quick navigation throughout the entire timeline may be performed using the first navigation bar by jumping from one predetermined point in time to the next. These predetermined points may be fixed time intervals (e.g., seconds or minutes apart) or can be at temporal locations based on the video content (e.g., scenes or chapters).

At block 2, a determination is made to generate a second navigation bar. The determination may be based on receiving an indication of an action, such as a selection of any point on the display, a selection of any point on the timeline, hovering over any portion of the display or the timeline, touching via use of a touch screen of any portion of the display or the timeline, and selection of a chapter or scene of the video, whether consecutive or non-consecutive.

In some embodiment, the determination to generate the second navigation bar may be based on detecting eye gaze towards any portion of the display or the timeline. In this embodiment, a user may be consuming a video using a media device or using a virtual, augmented, or mixed reality device. A camera associated with the media device or using a virtual, augmented, or mixed reality device may monitor the user's gaze to determine if the user's gaze is focused towards any portion of the display or the timeline. In response to detecting that the user's gaze is focused on any portion of the display or the timeline, the second navigation bar may be automatically generated without any user intervention.

While in some embodiments, the second navigation bar is generated in response to receiving the indication of any one or more of the actions described above, in other embodiments, the second navigation bar may be displayed at all times when the video is displayed or at all times when the first navigation bar is displayed. In some embodiments, the second navigation bar may disappear or fade out of the display when the first navigation bar disappears after its earlier appearance. Additional details relating to when and how long to display the second navigation bar are describe below in the description related to FIGS. 6 and 11.

At block 2, various configurations may be applied to the second navigation bar. These configurations may include configuring the second navigation bar to be displayed in variety of formats. Some examples of the display formats are described below in relation to the description of FIGS. 8A-8C. The formats may include the second navigation bar displayed vertically or horizontally. It may also include overlaying the second navigation bar on the first navigation bar. It may also include presenting the second navigation bar as ed as a zoomed in view of the first navigation bar. It may further include displaying the second navigation bar as a movable slider above the first navigation bar. In a 3D space, it may also be displayed at a different depth than the first navigation bar, such as in a virtual reality 3D environment.

The length of the second navigation may have various configurations. In some embodiments, the duration may be a percentage, or some other value based on the overall video timeline. For example, the duration may a 1% of the overall length of the video timeline, or some other smaller percentage such that a detailed frame-by-frame navigation over a short window of time is provided.

The duration may also be configured based on the scene, segment, chapter, or dialogues. For example, each second navigation bar may be configured to cover frames related to a scene, segment, chapter, or dialogue from its start to end. In this example, the system may determine the start and end of a related scene or attributes within a scene. Based on the determined start and end points, the system may determine the starting point and the ending point of the second navigation bar such that the starting and ending of the scene is covered. As such, a timeline may have several second navigation bars that vary in different lengths based on the scene, segment, or chapter they represent. Additionally, in some embodiments, the duration or length of the second navigation bar may be configured to include more than one scene or chapter as will be further described below in the description of FIG. 2.

At block 3, the generated second navigation bar provides a variety of functions that include navigation on a granular per frame-basis from one frame to the next. It also allows functionality to edit, annotate, jump, or transmit on a per-frame level. It further allows combining of scenes or chapters that are non-consecutives in the timeline of a video.

Figure 2:
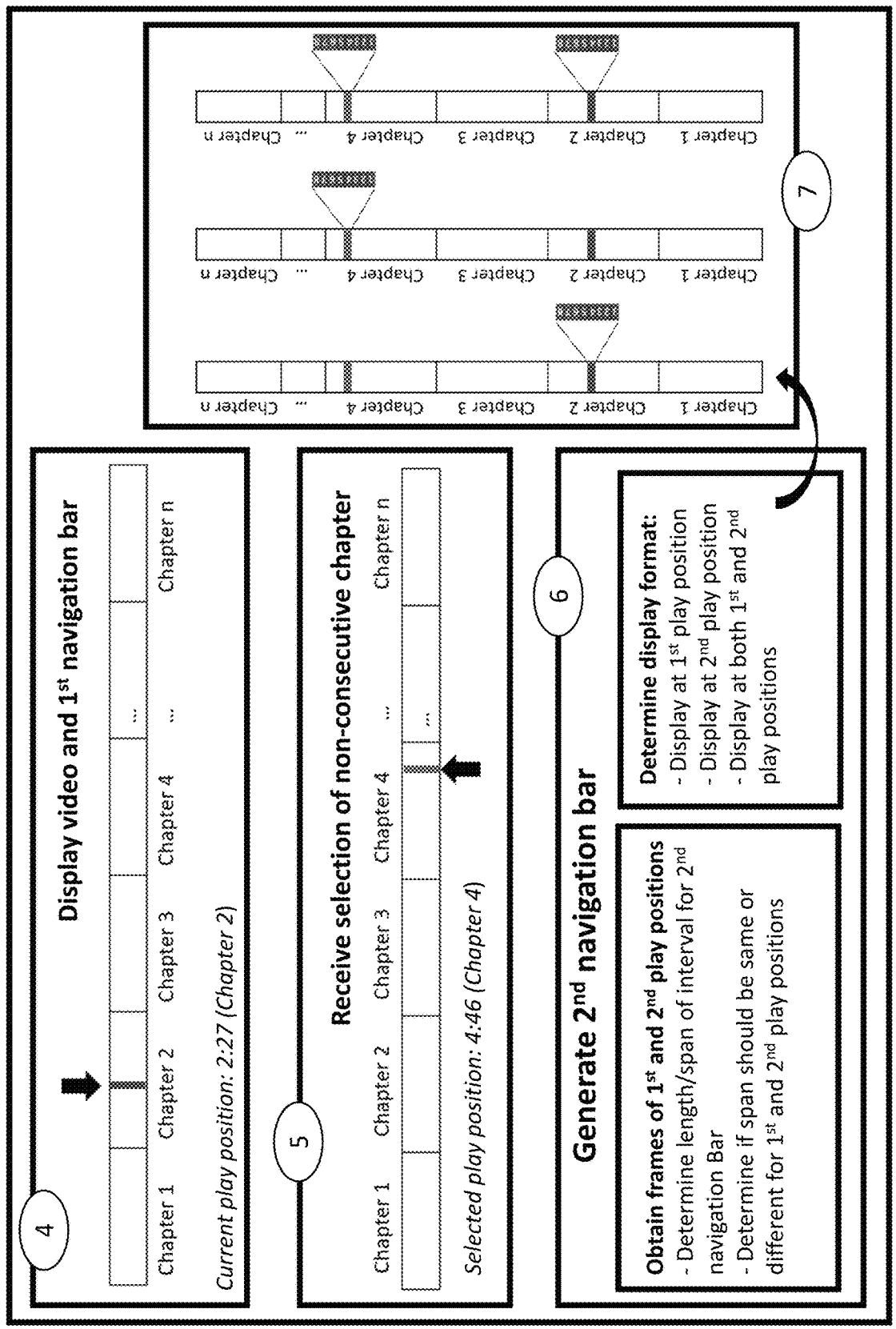
FIG. 2 is a block diagram of an example of a process for generating a second navigation bar for different non-consecutive chapters, in accordance with some embodiments of the disclosure.

FIG. 2 is a block diagram of an example of a process for generating a second navigation bar for different non-consecutive chapters, in accordance with some embodiments of the disclosure. As described above, the second navigation bar may include frames from two separate non sequential chapters that sequentially placed inside the second navigation bar thereby allowing navigation on a frame-by-frame basis from on chapter to another non-consecutive chapter.

In one embodiment, the process for generating a second navigation bar for different non-consecutive chapters begins at block 4. The first navigation bar is displayed during the playing of the video. The video includes a plurality of chapters, such as chapters 1-n, where each chapter is of a defined duration or length of time. The first navigation bar allows a coarse or quick navigation from one predetermined point in the chapter to the next predetermined point. As depicted, the current play position in the video is at time marker 2:27 in chapter 2.

At block 5, a selection is received to display frames from another chapter, such as chapter 4, which is nonconsecutive to the current chapter (chapter 2). The selection may be received for a specific time marker in chapter 4, such as at play position:4:46 in chapter 4. The selection may be received in response to sensing a touch of at the time marker in chapter 4. The system may detect a touch based on the sensors located in the touchscreen device that is used for consuming the video.

The selection may also be received in response to detecting a selection or hovering by a mouse, cursor, or touch. Additional methods of selections may be detected based on receiving a response relating to pinching or expanding at desired time marker in the timeline, such as at play position: 4:46 in chapter 4. Sections may also include receiving inputs of double tapping, selection by a pointing device or a remote control or a user's gaze directed towards the play position: 4:46 in chapter 4.

At block 6, upon receiving the selection of play position: 4:46 in chapter 4 while the current play position in the video timeline is at 2:27 in chapter 2, a second navigation frame may be generated to include frames of either one or both play positions, i.e., current and/or current and selected play positions in chapters 2 and 4 respectively.

As depicted in block 6, the control circuitry, such as the control circuitry 320 of server 302, may obtain video frames from both the current play position in chapter 2 as well as the selected play position in chapter 4. For example, based on the examples depicted in blocks 4 and 5, the control circuitry may obtain video frames for the current play position in chapter 2 (i.e., such as frames preceding and or succeeding the current play position) as well as video frames for the selected play position in chapter 4 (i.e., such as frames preceding and or succeeding the selected play position).

In one embodiment, at block 6, the control circuitry 320 may determine the length/span of the interval for the second navigation bar. The control circuitry 320 may determine the length to be based a percentage of the overall video timeline. It may also configure the length to a predetermined duration of time. In other embodiments, the duration may be configured based on the scene, segment, chapter, or dialogue both at the current play position and at the selected play position. As such, if the scene, segment, chapter, or dialogue at the current play position in chapter 2 has a longer duration than the scene, segment, chapter, or dialogue at the selected play position in chapter 4, then the control circuitry may allocate more frames to cover the scene, segment, chapter, or dialogue in chapter 2 than in chapter 4. As such, the allocation of number of frames within the second navigation bar may be different for the current and the selected play positions based on the duration of the scene, segment, chapter, or dialogues at each respective play position. In other embodiments, the same duration may be used for both play positions.

In one embodiment, at block 6, the control circuitry 320 may determine the display format of the second navigation bar. Some examples of the displays are depicted in block 7, where the second navigation bar may be displayed only at the current play position, only at the selected play position, or both at the current and the selected play position. Additional details of the display formats are provided in the description of FIGS. 8A-8D and 10A-10C.

Figure 3:
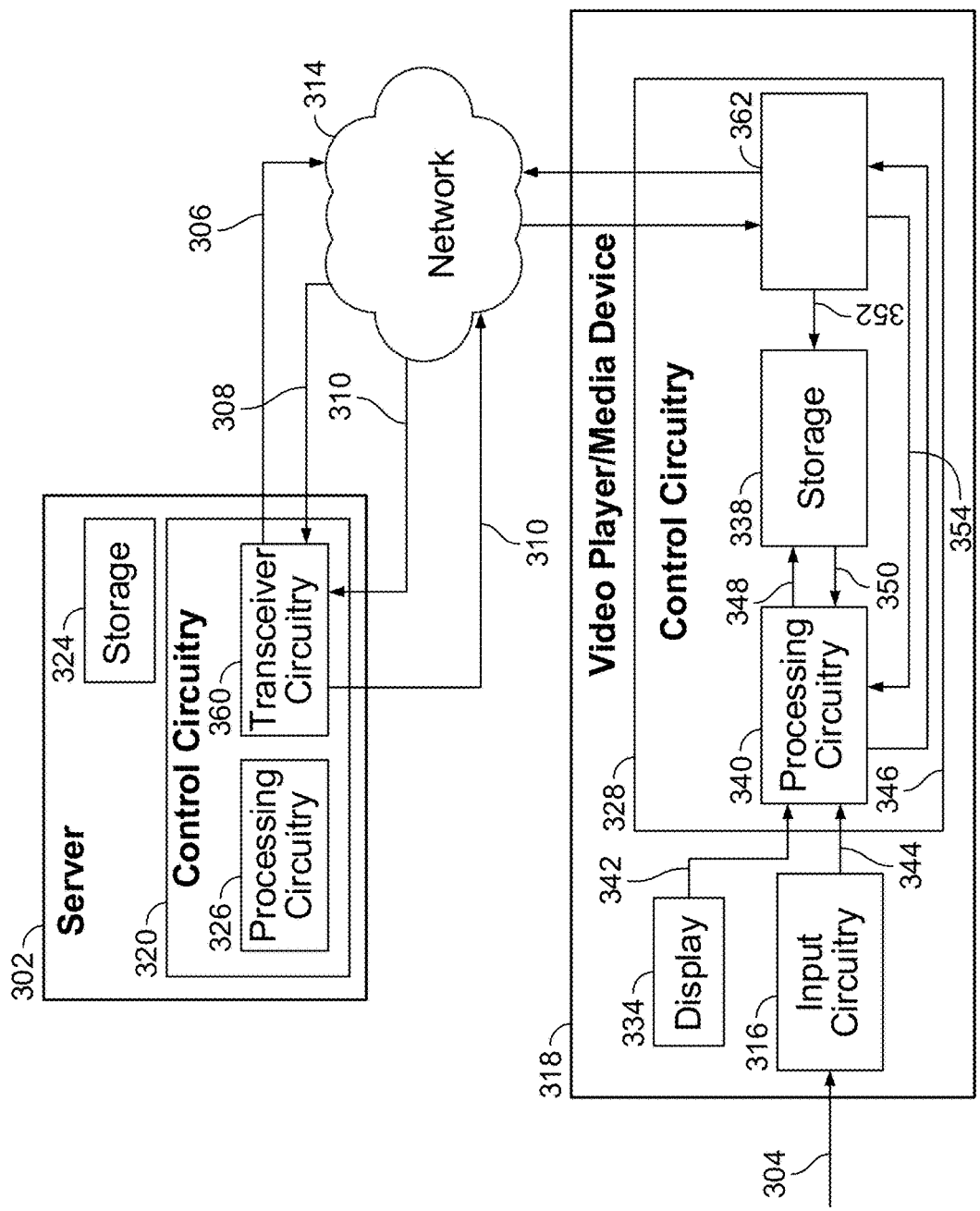
FIG. 3 is a block diagram of various components of a system for generating a second navigation bar, in accordance with some embodiments of the disclosure.
Figure 4:
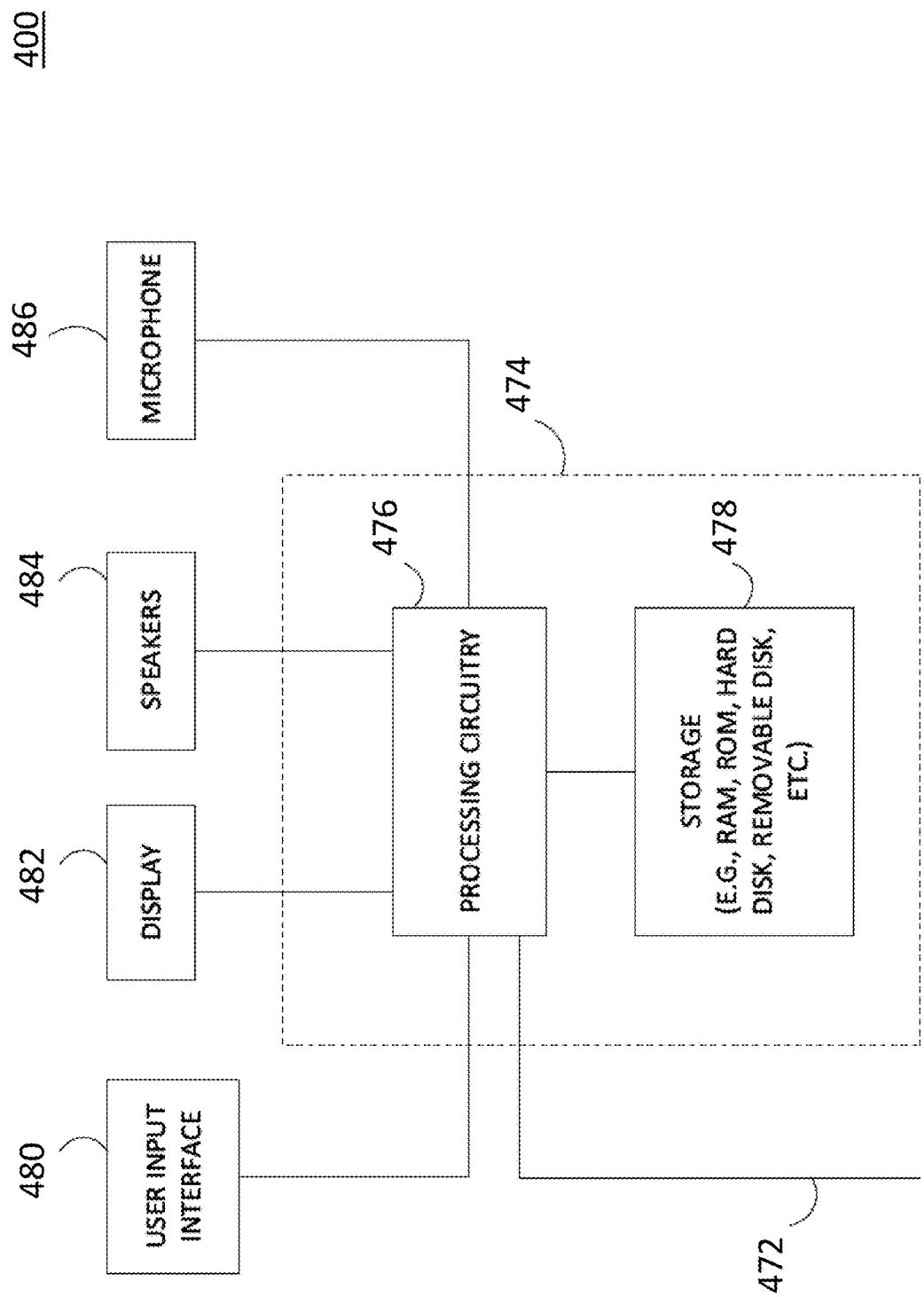
FIG. 4 is a block diagram of a generalized video playing device, in accordance with some embodiments of the disclosure.

FIG. 3 is a block diagram of various components of a system for generating a second navigation bar, in accordance with some embodiments of the disclosure and FIG. 4 is a block diagram of a generalized video playing device, in accordance with some embodiments of the disclosure. FIGS. 3 and 4 also describe exemplary devices, systems, servers, and related hardware that may be used to implement processes, functions, and functionalities described in relation to FIGS. 1-2, 5A, 5B, and 6-13. Further, FIGS. 3 and 4 may also be used to generate a second navigation bar, determine placement of the navigation bar, determine span window or length of the second navigation bar, determine display options associated with the second navigation bar, determine which frames and scenes to include in the second navigation bar, including frames from non-consecutive chapters of a video, and allow forwarding, rewinding, jumping to a specific temporal point, editing, trimming, annotating, and timestamping capabilities on a frame level.

In some embodiments, one or more parts of, or the entirety of system 300, may be configured as a system implementing various features, processes, functionalities, and components described in relation to FIGS. 1-2, 5A, 5B, and 6-13-7. Although FIG. 3 shows a certain number of components, in various examples, system 300 may include fewer than the illustrated number of components and/or multiples of one or more of the illustrated number of components.

System 300 is shown to include a computing device 318, a server 302 and a communication network 314. It is understood that while a single instance of a component may be shown and described relative to FIG. 3, additional instances of the component may be employed. For example, server 302 may include, or may be incorporated in, more than one server. Similarly, communication network 314 may include, or may be incorporated in, more than one communication network. Server 302 is shown communicatively coupled to computing device 318 through communication network 314. While not shown in FIG. 3, server 302 may be directly communicatively coupled to computing device 318, for example, in a system absent or bypassing communication network 314.

Communication network 314 may comprise one or more network systems, such as, without limitation, an internet, LAN, WIFI or other network systems suitable for audio processing applications. In some embodiments, system 300 excludes server 302, and functionality that would otherwise be implemented by server 302 is instead implemented by other components of system 300, such as one or more components of communication network 314. In still other embodiments, server 302 works in conjunction with one or more components of communication network 314 to implement certain functionality described herein in a distributed or cooperative manner. Similarly, in some embodiments, system 300 excludes computing device 318, and functionality that would otherwise be implemented by computing device 318 is instead implemented by other components of system 300, such as one or more components of communication network 314 or server 302 or a combination. In still other embodiments, computing device 318 works in conjunction with one or more components of communication network 314 or server 302 to implement certain functionality described herein in a distributed or cooperative manner.

Computing device 318 includes control circuitry 328, display 334 and input circuitry 316. Control circuitry 328 in turn includes transceiver circuitry 362, storage 338 and processing circuitry 340. In some embodiments, computing device 318 or control circuitry 328 may be configured as media device 400 of FIG. 4.

Server 302 includes control circuitry 320 and storage 324. Each of storages 324 and 338 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 324, 338 may be used to store various types of content, metadata, and or other types of data (e.g., they can be used to store a second navigation bar, frames included in the second navigation bar, display setting of the second navigation bar, user preferences relating to display of the second navigation bar, and associations of each second navigation bar to its predetermined points in the timeline of the video). Non-volatile memory may also be used (e.g., to launch a boot-up routine and other instructions). Cloud-based storage may be used to supplement storages 324, 338 or instead of storages 324, 338. In some embodiments, data relating to selection of frames from non-consecutive chapters may be recorded and stored in one or more of storages 312, 338.

In some embodiments, control circuitry 320 and/or 328 executes instructions for an application stored in memory (e.g., storage 324 and/or storage 338). Specifically, control circuitry 320 and/or 328 may be instructed by the application to perform the functions discussed herein. In some implementations, any action performed by control circuitry 320 and/or 328 may be based on instructions received from the application. For example, the application may be implemented as software or a set of executable instructions that may be stored in storage 324 and/or 338 and executed by control circuitry 320 and/or 328. In some embodiments, the application may be a client/server application where only a client application resides on computing device 318, and a server application resides on server 302.

The application may be implemented using any suitable architecture. For example, it may be a stand-alone application wholly implemented on computing device 318. In such an approach, instructions for the application are stored locally (e.g., in storage 338), and data for use by the application is downloaded on a periodic basis (e.g., from an out-of-band feed, from an internet resource, or using another suitable approach). Control circuitry 328 may retrieve instructions for the application from storage 338 and process the instructions to perform the functionality described herein. Based on the processed instructions, control circuitry 328 may determine a type of action to perform in response to input received from input circuitry 316 or from communication network 314. For example, in response to detecting an interaction with the video or interaction with the first navigation bar, the control circuitry 328 may perform the steps of process described in FIGS. 1-2, 5A, 5B, and 6 below and all the steps and processes described in all the figures depicted herein.

In client/server-based embodiments, control circuitry 328 may include communication circuitry suitable for communicating with an application server (e.g., server 302) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 314). In another example of a client/server-based application, control circuitry 328 runs a web browser that interprets web pages provided by a remote server (e.g., server 302). For example, the remote server may store the instructions for the application in a storage device. The remote server may process the stored instructions using circuitry (e.g., control circuitry 328) and/or generate displays. Computing device 318 may receive the displays generated by the remote server and may display the content of the displays locally via display 334. For example, the displays of the second navigation bar in various formats as described in FIGS. 8A-D, 10A-C, and 11 may be displayed. This way, the processing of the instructions is performed remotely (e.g., by server 302) while the resulting displays, such as the display windows described elsewhere herein, are provided locally on computing device 318. Computing device 318 may receive inputs from the user via input circuitry 316 and transmit those inputs to the remote server for processing and generating the corresponding displays. Alternatively, computing device 318 may receive inputs from the user via input circuitry 316 and process and display the received inputs locally, by control circuitry 328 and display 334, respectively.

Server 302 and computing device 318 may transmit and receive content and data such as objects, frames, snippets of interest, and input from primary devices and secondary devices, such as AR devices. Control circuitry 320 and/or 328 may send and receive commands, requests, and other suitable data through communication network 314 using transceiver circuitry 360, 362, respectively. Control circuitry 320 and/or 328 may communicate directly with each other using transceiver circuits 360, 362, respectively, avoiding communication network 314.

It is understood that computing device 318 is not limited to the embodiments and methods shown and described herein. In nonlimiting examples, computing device 318 may be a primary device, a personal computer (PC), a laptop computer, a tablet computer, a WebTV box, a personal computer television (PC/TV), a PC media server, a PC media center, a handheld computer, a mobile telephone, a smartphone, a virtual, augment, or mixed reality device, or a device that can perform function in the metaverse, or any other device, computing equipment, or wireless device, and/or combination of the same capable of suitably displaying primary content and secondary content.

Control circuitry 320 and/or 328 may be based on any suitable processing circuitry such as processing circuitry 326 and/or 340, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 320 and/or control circuitry 318 are configured to generate a second navigation bar, determine placement of the navigation bar, determine span window or length of the second navigation bar, determine display options associated with the second navigation bar, determine which frames and scenes to include in the second navigation bar, including frames from non-consecutive chapters of a video, and allow forwarding, rewinding, jumping to a specific temporal point, editing, trimming, annotating, and timestamping capabilities on a frame level and perform all processes described and shown in connection with FIGS. 1-2, 5A, 5B, and 6-13-7.

Computing device 318 receives a user input 304 at input circuitry 316. For example, computing device 318 may receive a user input like user's gaze or some other user engagement with the second navigation bar.

User input 304 may be received from internet browsing, interaction with a video interface, virtual, augmented, or mixed reality headsets, mobile data. Transmission of user input 304 to computing device 318 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 316 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 340 may receive input 304 from input circuit 316. Processing circuitry 340 may convert or translate the received user input 304 that may be in the form of voice input into a microphone, or movement or gestures to digital signals. In some embodiments, input circuit 316 performs the translation to digital signals. In some embodiments, processing circuitry 340 (or processing circuitry 326, as the case may be) carries out disclosed processes and methods. For example, processing circuitry 340 or processing circuitry 326 may perform processes as described in FIGS. 1-2, 5A, 5B, and 6, respectively.

FIG. 4 shows a generalized embodiment of an electronic equipment device 400, in accordance with one embodiment. In an embodiment, the equipment device 400, is the same equipment device 302 of FIG. 3. The equipment device 400 may receive content and data via input/output (I/O) path 402. The I/O path 402 may provide audio content (e.g., broadcast programming, on-demand programming, internet content, content available over a local area network (LAN) or wide area network (WAN), and/or other content) and data to control circuitry 404, which includes processing circuitry 406 and a storage 408. The control circuitry 404 may be used to send and receive commands, requests, and other suitable data using the I/O path 402. The I/O path 402 may connect the control circuitry 404 (and specifically the processing circuitry 406) to one or more communications paths. I/O functions may be provided by one or more of these communications paths but are shown as a single path in FIG. 4 to avoid overcomplicating the drawing.

The control circuitry 404 may be based on any suitable processing circuitry such as the processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Memory may be an electronic storage device provided as the storage 408 that is part of the control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 408 may be used to store a second navigation bar, frames included in the second navigation bar, display setting of the second navigation bar, user preferences relating to display of the second navigation bar, and associations of each second navigation bar to its predetermined points in the timeline of the video and all the functionalities and processes discussed herein. Cloud-based storage, described in relation to FIG. 4, may be used to supplement the storage 408 or instead of the storage 408.

The control circuitry 404 may include audio generating circuitry and tuning circuitry, such as one or more analog tuners, audio generation circuitry, filters or any other suitable tuning or audio circuits or combinations of such circuits. The control circuitry 404 may also include scaler circuitry for upconverting and down converting content into the preferred output format of the equipment device 400. The control circuitry 404 may also include digital-to-analog converter circuitry and analog-to-digital converter circuitry for converting between digital and analog signals. The tuning and encoding circuitry may be used by the equipment device 400 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 408 is provided as a separate device from the equipment device 400, the tuning and encoding circuitry (including multiple tuners) may be associated with the storage 408.

The user may utter instructions to the control circuitry 404, which are received by the microphone 416. The microphone 416 may be any microphone (or microphones) capable of detecting human speech. The microphone 416 is connected to the processing circuitry 406 to transmit detected voice commands and other speech thereto for processing. In some embodiments, voice assistants (e.g., Siri, Alexa, Google Home and similar such voice assistants) receive and process the voice commands and other speech.

The equipment device 400 may include an interface 410. The interface 410 may be any suitable user interface, such as a remote control, mouse, trackball, keypad, keyboard, touch screen, touchpad, stylus input, joystick, or other user input interfaces. A display 412 may be provided as a stand-alone device or integrated with other elements of the equipment device 400. For example, the display 412 may be a touchscreen or touch-sensitive display. In such circumstances, the interface 410 may be integrated with or combined with the microphone 416. When the interface 410 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 410 may be HDTV-capable. In some embodiments, the display 412 may be a 3D display. The speaker (or speakers) 414 may be provided as integrated with other elements of equipment device 400 or may be a stand-alone unit. In some embodiments, the display 412 may be outputted through speaker 414.

The equipment device 400 of FIG. 4 can be implemented in system 300 of FIG. 3 as equipment device 302, but any other type of user equipment suitable for allowing communications between two separate user devices for performing the functions elated to implementing machine learning (ML) and artificial intelligence (AI) algorithms, and all the functionalities discussed associated with the figures mentioned in this application The equipment device 400 of any other type of suitable user equipment suitable may also be used to implement ML and AI algorithms, and related functions and processes as described herein. For example, equipment device s such as television equipment, computer equipment, wireless user communication devices, or similar such devices may be used. Equipment device s may be part of a network of devices. Various network configurations of devices may be implemented and are discussed in more detail below.

Figure 5A:
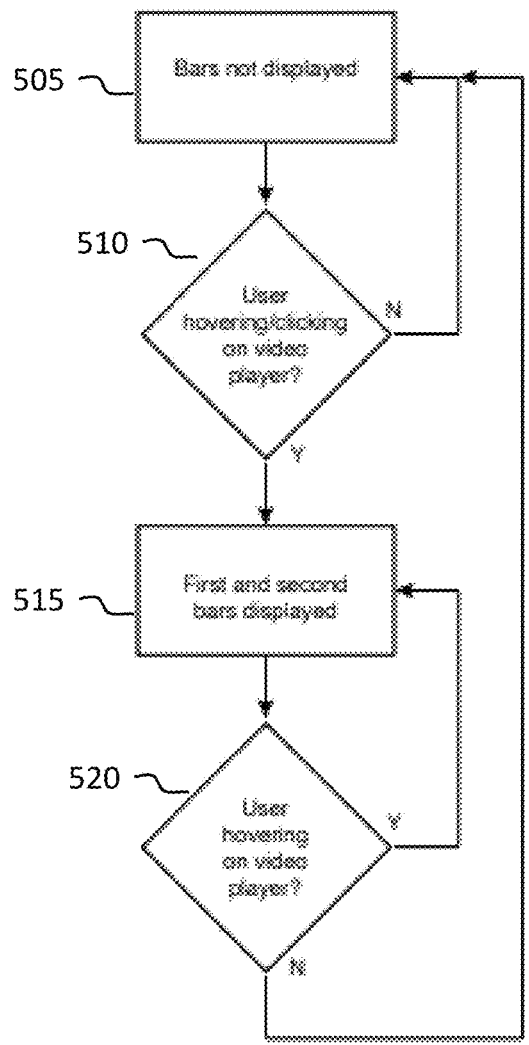
FIGS. 5A and 5B are flowchart of a process for determining when to display the second navigation bar, in accordance with some embodiments of the disclosure.

FIG. 5A is flowchart of a process for determining when to display the second navigation bar, in accordance with some embodiments of the disclosure. In one embodiment, as depicted, at block 505, at the outset, the first and second navigation bar may not be displayed. At block 510, it determination may be made whether a user has selected a point on the video player such as by hovering or clicking over a display portion of the video player.

If a determination is made that the user has not selected a point on the video player, then the process may move back to block 505 where the bars are not displayed on the video player. On the other hand, if a determination is made that the user has selected a point on the video player, then the control circuitry may display both the first and second navigation bars on the video player. Selection, or interaction, may include the user hovering, selecting, double clicking or tapping, zooming, having their gaze focused on a particular point in the display, moving their remote control, or any other interaction performed by a user with the video player.

At block 520 at determination may be made if the user is continuing to interact with the video player, such as by either hovering, selecting, double clicking or tapping, zooming, or any other action. If a determination is made that the user is continuing to interact with the video player, then the first and second navigation bars will be continued to be displayed as depicted in block 515. If a determination is made that the user that was interacting at block 510 with the video player is no longer interacting with the video player at block 520, then the process may move to block 505 where the bars that were previously displayed at block 515 are no longer displayed on the video player.

Figure 5B:
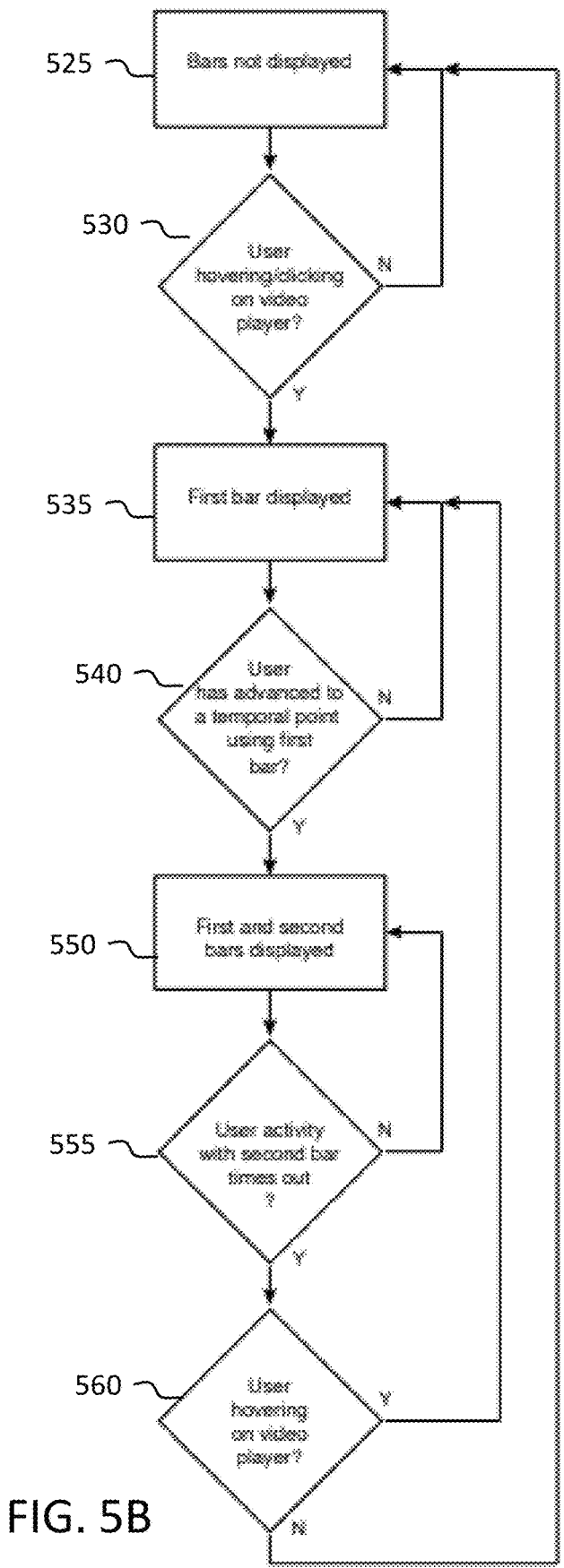

FIG. 5B is another flowchart of a process for determining when to display the second navigation bar, in accordance with some embodiments of the disclosure. In one embodiment, as depicted, at block 505, at the outset, the first and second navigation bar may not be displayed on a display interface of the video player.

At block 530, the control circuitry may decide whether a user is interacting with the video player. Interaction may include the user hovering, selecting, double clicking or tapping, zooming, having their gaze focused on a particular point in the display, moving their remote control, or any other interaction performed by a user with the video player.

If a determination is made at block 530, that the user is not interacting with the video player, then the process may move to block 525 where the navigation bars may not be displayed on the display interface of the video player.

If a determination is made at block 530, that the user is interacting with the video player, then the process may move to block 555 where a first navigation bar is displayed on the display interface of the video player.

At block 540 it determination is made whether the user has advanced to a temporal point using the first navigation bar. The temporal point may be a predetermined point, also referred to a jump point in the first navigation bar. If a determination is made that the user has not advanced to the temporal point, then the process may display the first navigation bar and not the second navigation bar.

If a determination is made at block 540 that the user has advanced to a temporal point in the first navigation bar, then, at block 550, the control circuitry may display both the first and the second navigation bar on the display interface of the video player.

At block 555, the control circuitry may determine if the user is continuing to interact with the second navigation bar or if the user activity with the second navigation bar has timed out. In some embodiments, the second navigation bar may be preset to a timer. If no interaction with the second navigation bar is detected before the timer has expired/timed out, then the second navigation bar may no longer be displayed.

If a determination is made that no interaction is detected, or, when there is a timer involved, no interaction is detected before the timer has timed out, such as at block 560, then the second navigation bar which is displayed may no longer continue to be displayed.

Figure 6:
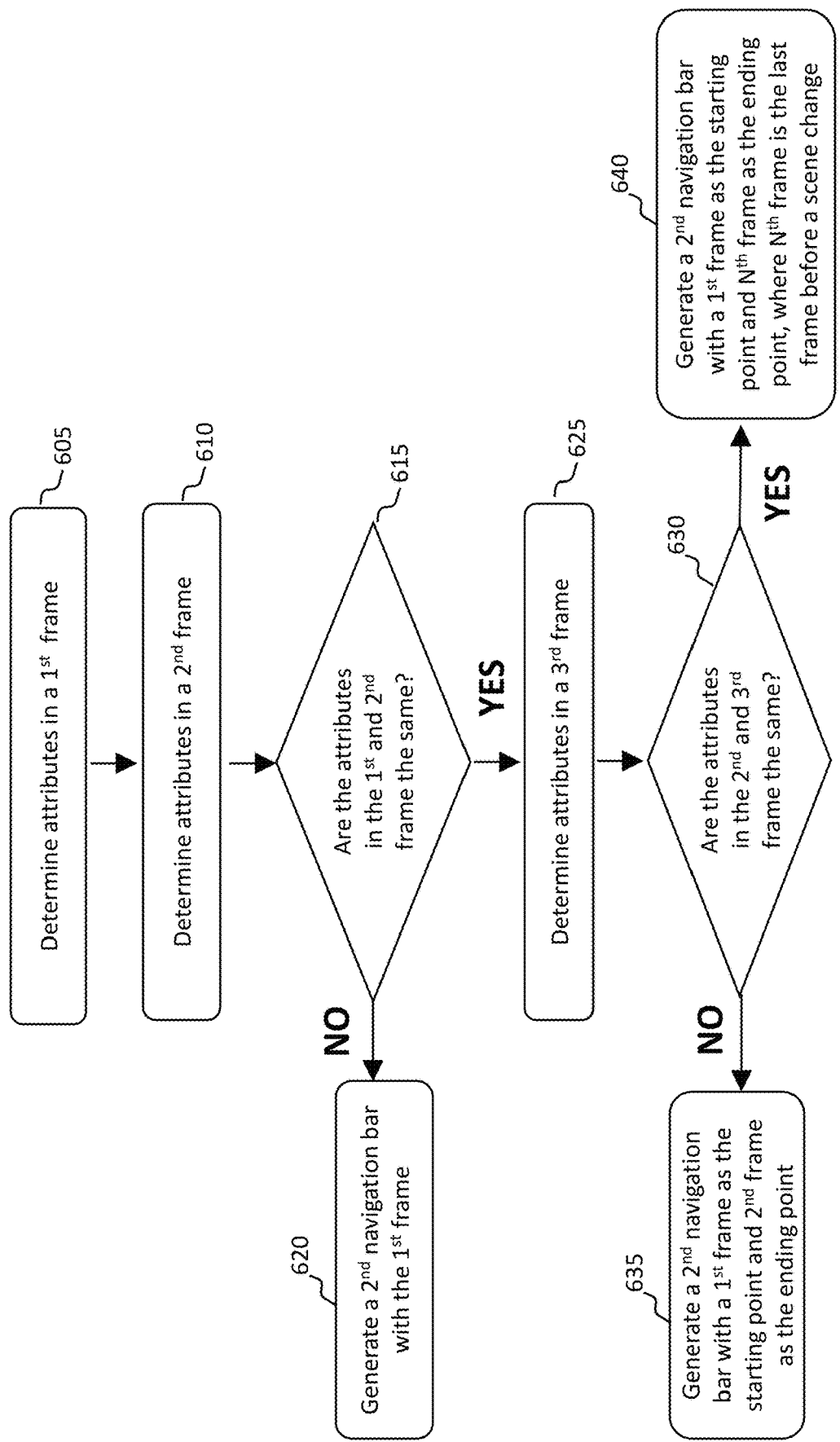
FIG. 6 is flowchart of a process for determining a time interval for the second navigation bar based on a scene or chapter, in accordance with some embodiments of the disclosure.

FIG. 6 is flowchart of a process for determining a time interval for the second navigation bar based on a scene or chapter, in accordance with some embodiments of the disclosure.

In one embodiment, the duration of the second navigation bar is determined based on a scene, segment, chapter, or a dialogue. The duration of the second navigation bar may be configured to ensure that the start and end of a scene, chapter, segment, or dialogue is captured within the second navigation bar, i.e., that a frame-by-frame navigation of the entire scene or chapter is provided.

The process for determining the length of such second navigation bar that include the complete scene, chapter, segment, or dialogue such that a portion is not left out, in one embodiment, begins at block 605.

Figure 7:
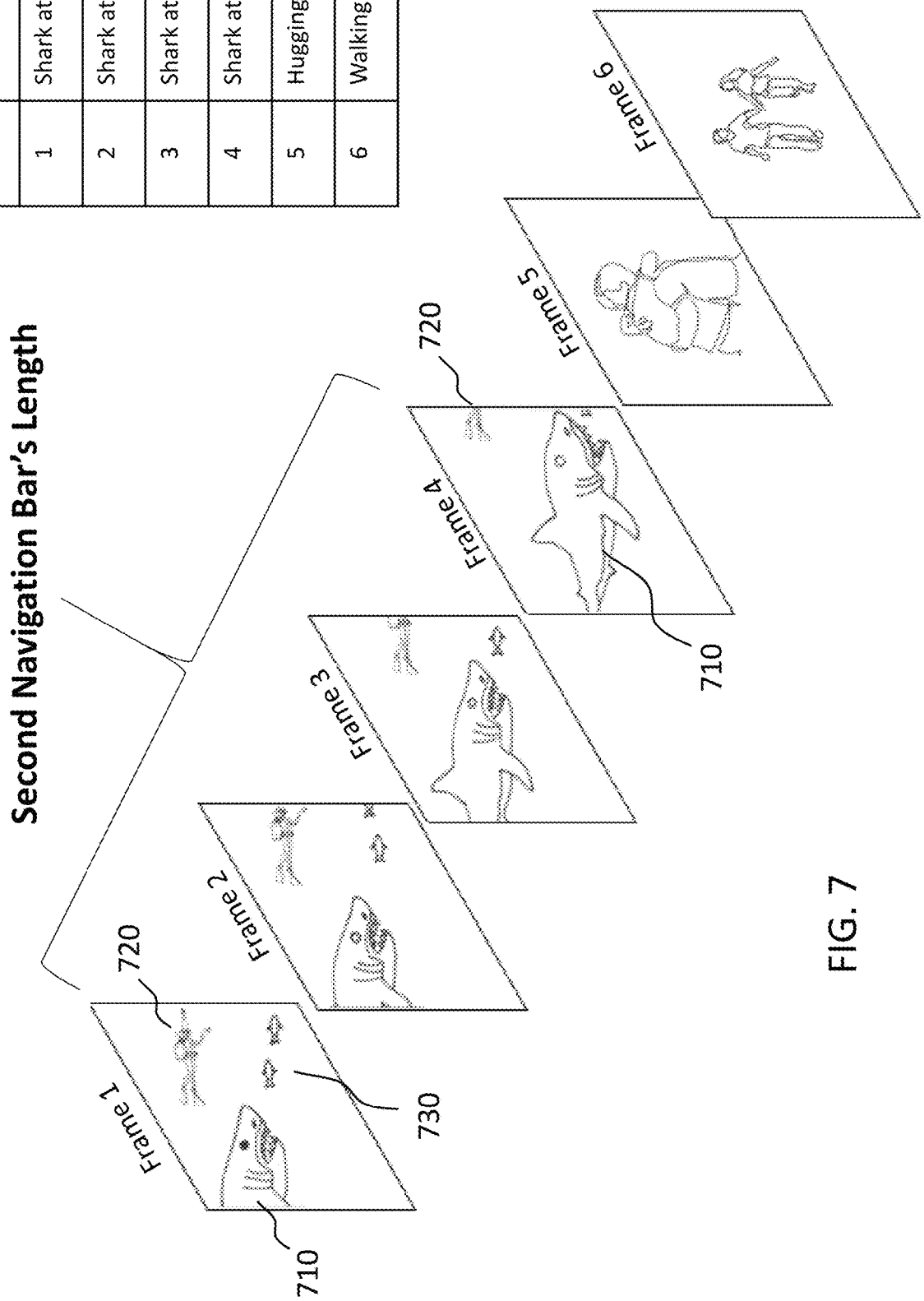
FIG. 7 is an example of a time interval for the second navigation bar based on a scene or chapter, in accordance with some embodiments of the disclosure.

At block 605, the control circuitry may determine the attributes in the first frame of a scene, such as the scene depicted in FIG. 7 of a shark attack. The attributes Frame 1 (710), as depicted in the example of FIG. 7, include a shark and a scuba diver.

At block 610, the control circuitry determines the attributes in the 2nd frame that sequentially follows the first frame. As depicted in example of FIG. 7, the second frame, i.e., Frame 2 (720) also includes the same shark and the scuba diver as the attributes.

At block 615, the control circuitry compares the attributes in the first frame to the attributes in the 2nd frame to determine if the attributes are the same. In another embodiment the control circuitry may compare the attributes from the $1^{st}$ frame to the $2^{nd}$ frame that sequentially follows the $1^{st}$ frame to determine if a majority of the attributes or a percentage of the attributes above a predetermined threshold are the same.

A second navigation bar with that includes just the $1^{st}$ frame. In another embodiment, the control circuitry may require a minimum number of frames to be included in a second navigation bar and may not generate a second navigation bar if the number of frames are below the minimum number of required frames.

If a determination is made at block 615 that the attributes in the $1^{st}$ frame and the $2^{nd}$ frame are the same, or that a majority or a threshold number of attributes in the $1^{st}$ frame and the $2^{nd}$ frame are the same, then the control circuitry, at blocks 625 and 630, may determine if the attributes in the $2^{nd}$ frame and the $3^{rd}$ frame are the same, or that a majority or a threshold number of attributes in the $1^{st}$ frame and the $2^{nd}$ frame are the same.

If a determination is made at block 630 that the attributes in the $2^{nd}$ frame and the $3^{rd}$ frame are not the same, or that a majority or a threshold number of attributes in the $2^{nd}$ frame and the $3^{rd}$ frame are not the same, then the control circuitry may generate the second navigation bar that has a length or duration to include the $1^{st}$ and the $2^{nd}$ frame. Since the $1^{st}$ and $2^{nd}$ frame have the same attributes and the $3^{rd}$ frame does not have the same attributes, or a majority or a threshold number of attributes of the $2^{nd}$ frame, the control circuitry may associate the $1^{st}$ frame and the $2^{nd}$ frame with a same scene or chapter and $3^{rd}$ frame with a different scene. As such, frames from the same scene or chapter may be kept together in a second navigation bar and it may not include the $3^{rd}$ frame which is not associate with same scene or chapter.

If a determination is made at block 630 that the attributes in the $2^{nd}$ frame and the $3^{rd}$ frame are the same, or that a majority or a threshold number of attributes in the $2^{nd}$ frame and the $3^{rd}$ frame are the same, then the control circuitry may continue to analyze next sequential frames until it reaches an nth frame in which does not have the same attributes, or a majority or a threshold number of attributes of the previous frame. The control circuitry may then generate a second navigation bar, as depicted at block 640, with all the frames of the scene up until the nth frame which is associated with a different scene.

Blocks 615-640 are further explained, as an example, in relation to FIG. 7. As depicted in FIG. 7, frames 1-4 include the same attributes, which is the shark and the scuba diver. Frame 1 may include an additional attribute, the small fishes 730, that are not included in Frame 4. Frames 5 and 6 may include different scenes of people hugging and walking and not include the shark, fishes, or the scuba diver as also described in the table of FIG. 7.

In one embodiment, applying the process of FIG. 6 to the example of FIG. 7, the control circuitry may determine that attributes of Frames 1-4 are substantially the same or the number of attributes that are similar between the frames exceed a predetermined threshold. As such, the control circuitry may generate a second navigation bar that has a length to include Frames 1-4 and not Frames 5-6 that may be associated with a different scene.

Referring back to FIG. 6, the temporal points referred to earlier are placed around the predetermined points. For example, in one embodiment, the predetermined point may be at the start or end of a second scene, segment, chapter, or dialogue along the timeline of the video, i.e., it may be at a boundary of the starting or ending of the second scene, segment, chapter, or dialogue. Accordingly, there are several possibilities where the first and the last temporal point may be placed in relation to the predetermined point. In one embodiment, the first temporal may be placed at the starting boundary of the same second scene, segment, chapter, or dialogue as the predetermined point and the last temporal point may be placed at the end of that second scene, segment, chapter, or dialogue.

Continuing with the same embodiment where the predetermined point is at the starting boundary of the second scene, segment, chapter, or dialogue, the first temporal may also be placed at the starting boundary of a first scene, segment, chapter, or dialogue that precedes the predetermined point. Additionally, the last temporal point may be placed at same point in the timeline as the predetermined point. In other words, the last temporal point may be placed at the ending boundary of the first scene, segment, chapter, or dialogue, which also coincides with the starting boundary of the second scene, segment, chapter, or dialogue at which the predetermined point is placed.

In yet another embodiment, the first and last temporal may overlap any portion of the first or the second scene, segment, chapter, or dialogue and have the predetermined point in-between the first and last temporal point.

In yet another embodiment, the span of coverage between the first and the last temporal point may be a predefined length, and, in another embodiment, a user may dynamically increase or decrease the span of coverage by performing increase/decrease operations, such as dragging the span window (i.e., the coverage of span) with a mouse, pinching and zooming or contracting the span window by their finger on a touch screen interface.

Figure 12:
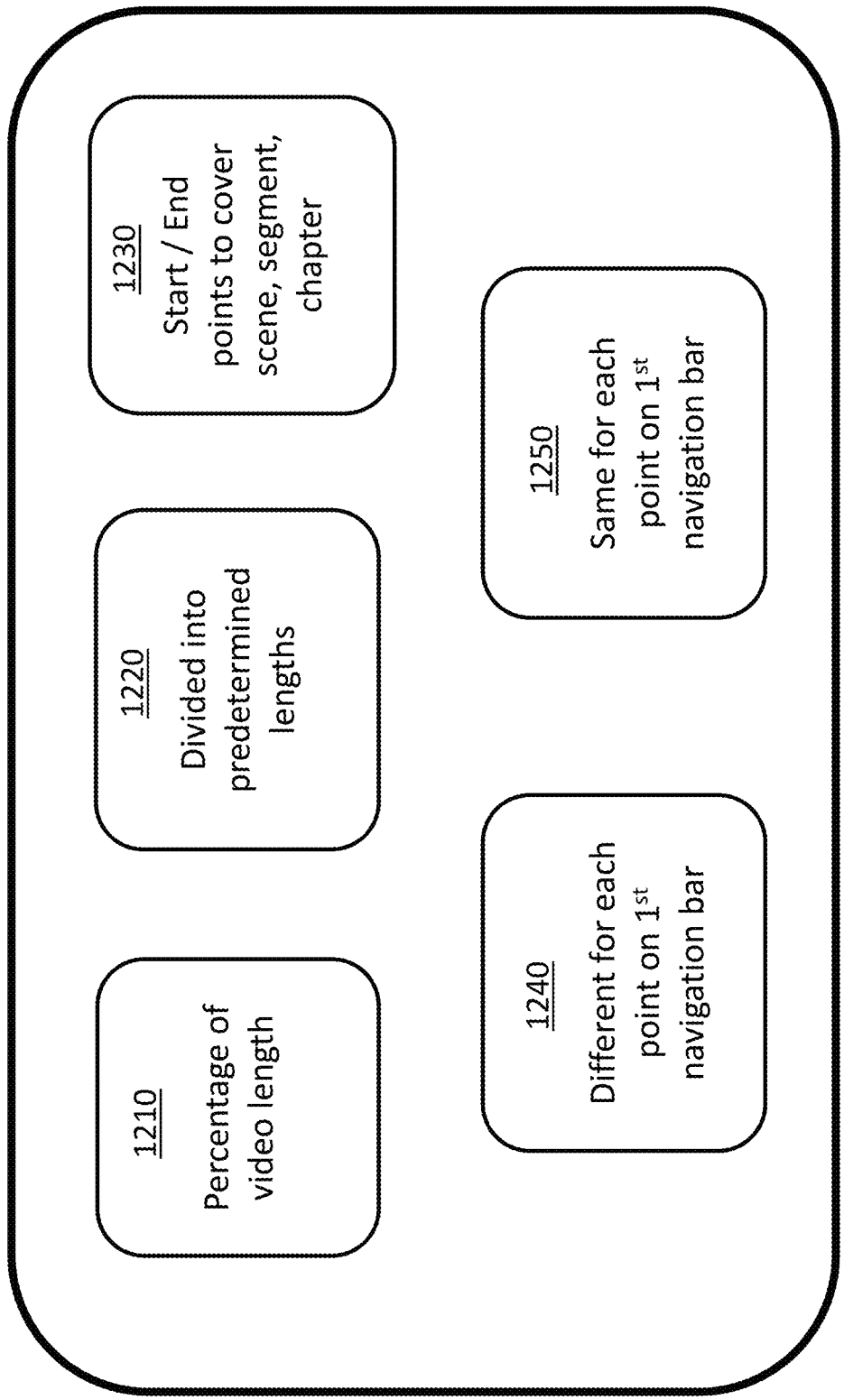
FIG. 12 is a block diagram of various time intervals that can be configured for the second navigation bar, in accordance with some embodiments of the disclosure.

Regardless of how the length of span or length of coverage is determined, i.e., predefined, determined by a calculated methods as described in FIG. 12, or dynamically modified, the system may determine whether the length of span exceeds a predetermined threshold. Since one of the goals is to provide a frame accurate level of navigation, in larger videos, having a span that is beyond the predefined length may not be optimal to accurately navigate with a frame level accuracy or may be more difficult than having a shorter span that is within the predefined length. As such, the system may prevent the span window to exceed the predefined length.

In addition to the plurality of methods described herein of navigating using the first and the second navigation bar, in some embodiments, navigation may also be performed by navigating through thumbnails. In this embodiment, a plurality of thumbnails that represent each I-frame of the video are provided for selection. The thumbnails, which may be compressed I-frame images, may be displayed in a separate list that can be accessed by the user either upon selecting a thumbnail display option or when the user interacts with the second navigation bar. The thumbnails may be listed for the entire video, by chapters, or by scenes within a chapter. In some embodiments, if a specific chapter is being browsed, then thumbnails for only that chapter which is being browsed may be displayed or provided for access. Navigation within the second navigation bar may be achieved by browsing through the thumbnails. Selection of a specific thumbnail may allow the system to advance the current play position to the I-frame that is associated with the thumbnail.

Figure 8A:
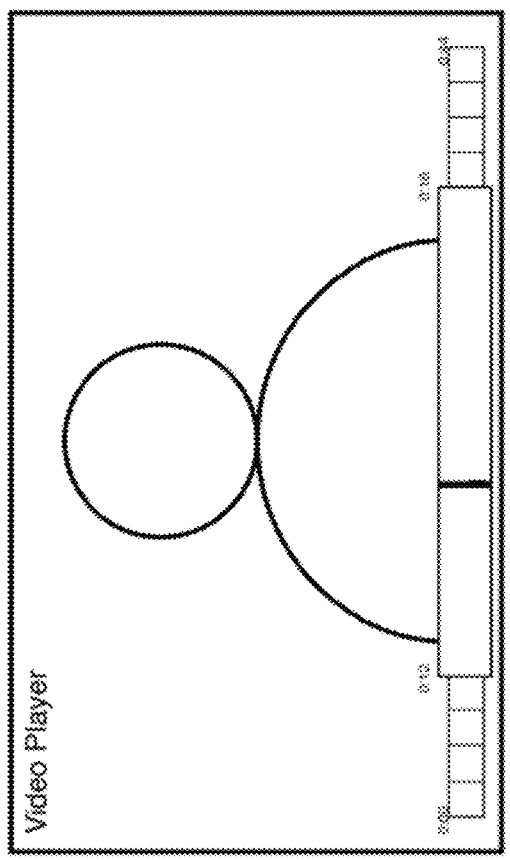
FIGS. 8A-8D are examples of a various display formats of the second navigation bar, in accordance with some embodiments of the disclosure.

FIGS. 8A-8D are examples of a time interval for the second navigation bar based on a scene or chapter, in accordance with some embodiments of the disclosure. As depicted, in FIGS. 8A-8D, the control circuitry, such as the control circuitry 320 of server 302, may configure several possibilities for the display and arrangement of the first and the second navigation bars. In one embodiment, as depicted in FIG. 8A, the first navigation bar may appear horizontally at the bottom of the display interface of the video player and the second navigation bar may appear vertically and at 90 degrees to the first navigation bar.

Figure 8B:
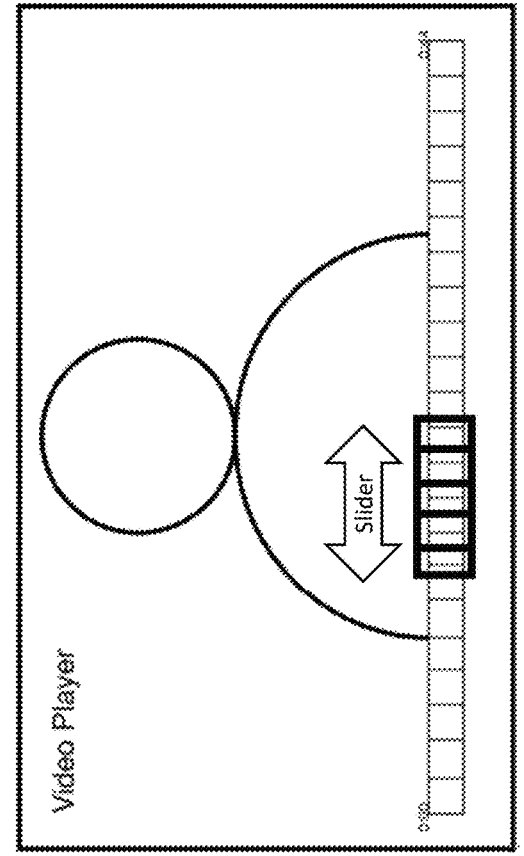

In another embodiment, as depicted in FIG. 8B, the first navigation bar may appear horizontally at the bottom of the display interface of the video player and the second navigation bar may appear overlayed on the first navigation bar and seem to magnify a region of the first navigation bar.

Figure 8C:
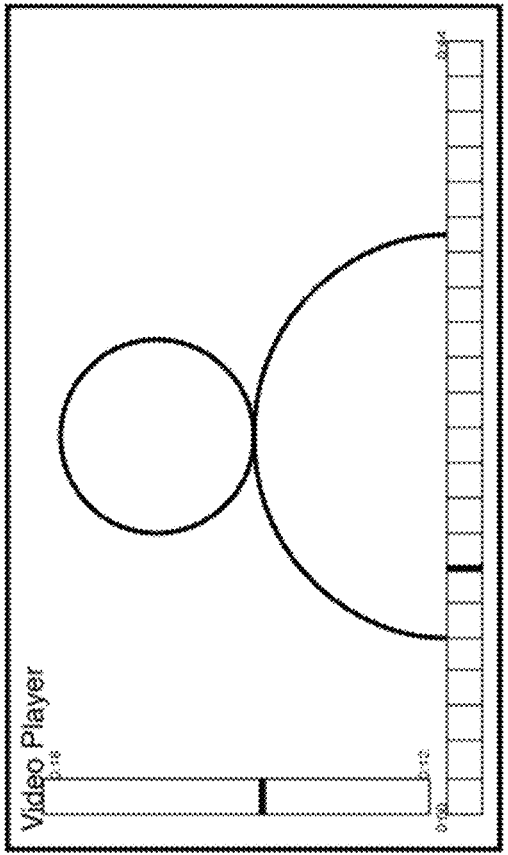

In another embodiment, as depicted in FIG. 8C, the first navigation bar may appear horizontally at the bottom of the display interface of the video player and the second navigation bar may appear higher on the display interface than the first navigation bar.

Figure 8D:
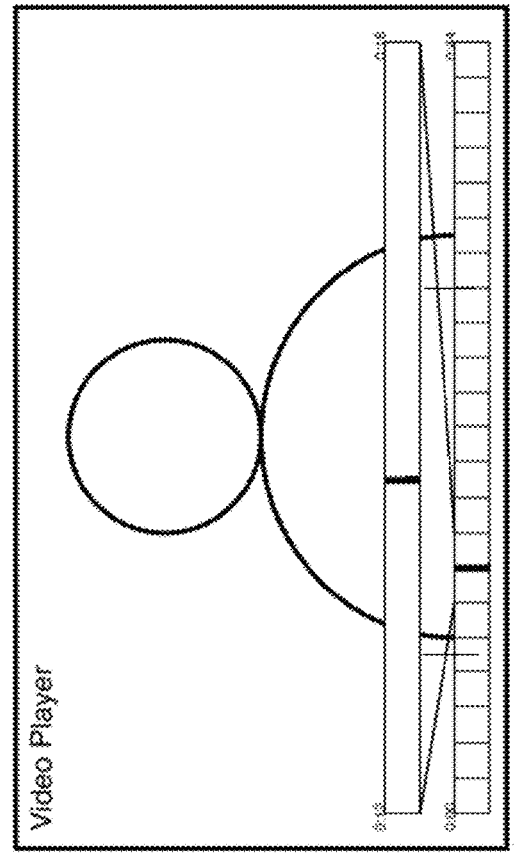

In yet another embodiment, as depicted in FIG. 8D, the first navigation bar may appear horizontally at the bottom of the display interface of the video player and the second navigation bar may appear as a movable slider that is overlayed on the first navigation bar.

Figure 10A:
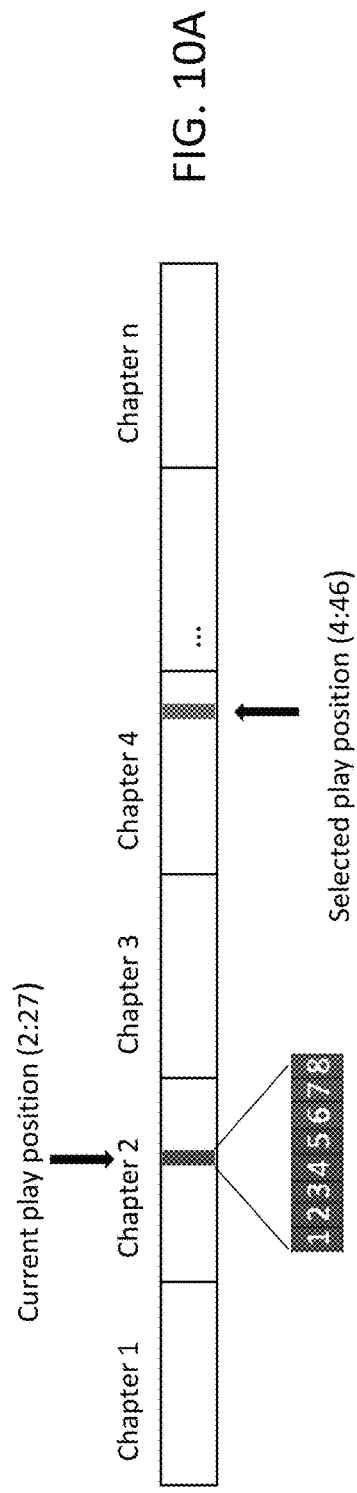
FIGS. 10A-10C are examples of second navigation bars displayed at various timeline locations in the video when they cover multiple non-consecutive chapters, in accordance with some embodiments of the disclosure.
Figure 10B:
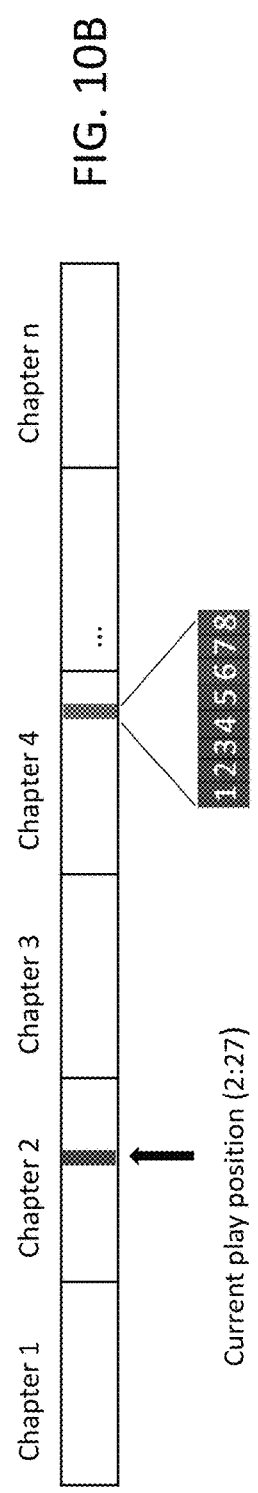
Figure 10C:
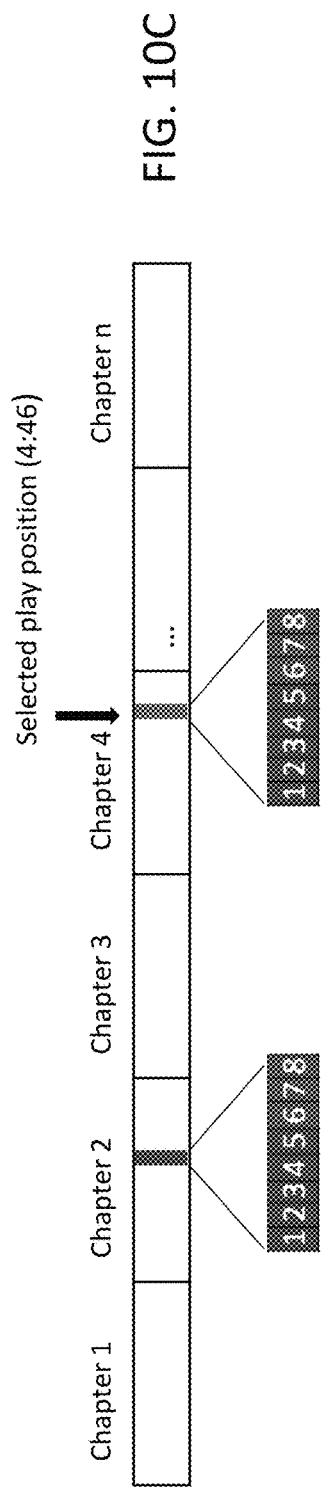

Although a few possibilities of formats of the arrangement of the first and second navigation bars are depicted in FIGS. 8A-8D, the embodiments are not so limited. For example, in a virtual reality environment, or a 3D environment, the control circuitry, such as the control circuitry 320 of server 302, may configure the first navigation bar and the second navigation bar to be displayed at different depth perceptions to the user. The navigation bars may also be both vertical, horizontal, or at some degree offset from one another. They may also be displayed at different chapters as depicted in FIGS. 10A-10C.

The navigation bars formats may be displayed based on user or system preferences. In some embodiments, certain formats may be preferred based on their functionality, for example, an overlayed arrangement may be desired for a pinch-to-zoom function.

This dual-bar interface of the first and second navigation bars may be applied to any video on any size screen or window, though it is most useful for videos of more than a few minutes in length. The spacing of fixed time intervals can be a constant amount of time or a percentage of the overall video length (potentially selectable as a user preference). When temporal locations are content-dependent, a source of metadata giving the locations may be generated automatically or manually and provided to the video player software in addition to the video.

Figure 9:
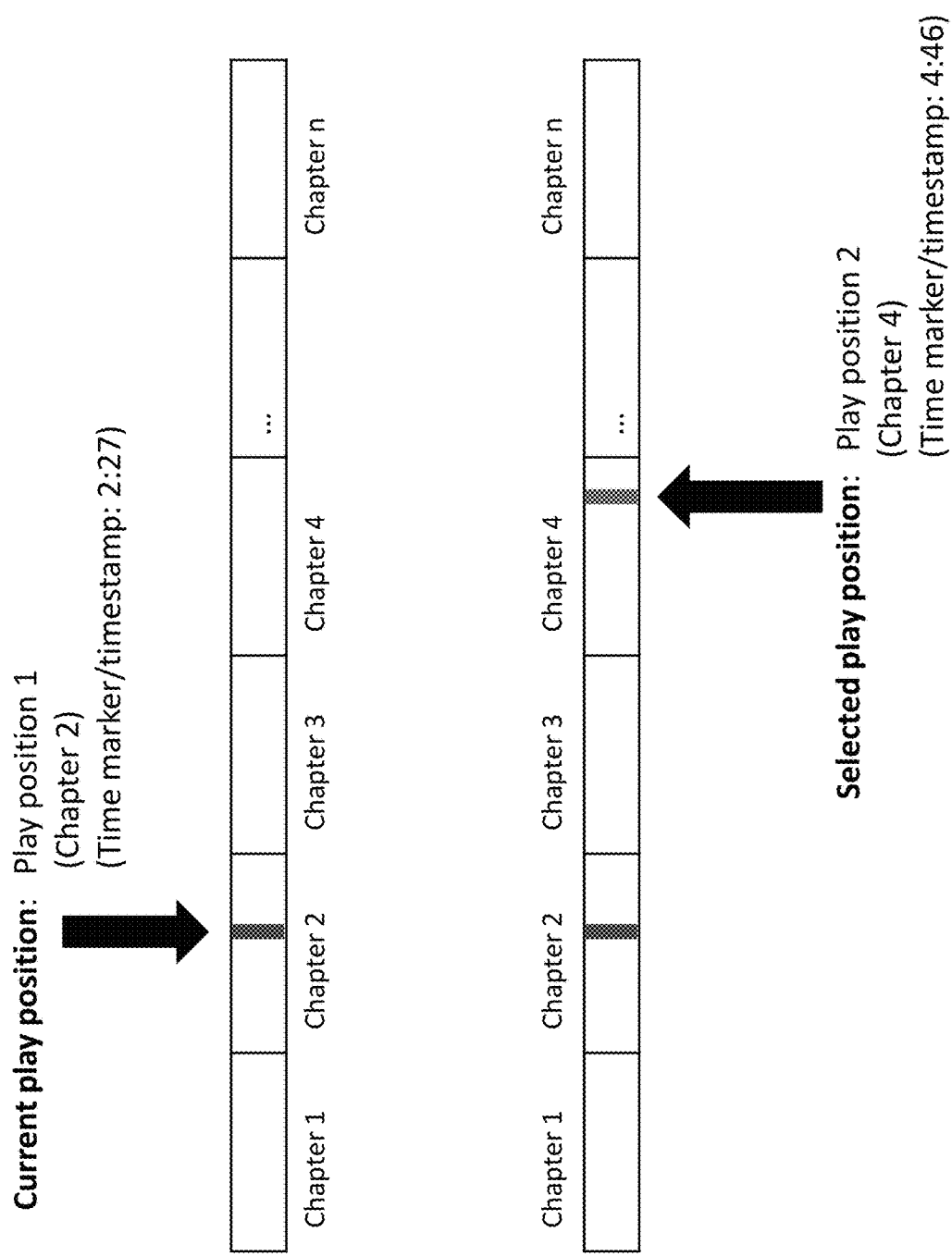
FIG. 9 is an example of a second navigation bar that covers multiple non-consecutive chapters, in accordance with some embodiments of the disclosure.

FIG. 9 is an example of a second navigation bar that covers multiple non-consecutive chapters, in accordance with some embodiments of the disclosure. In one embodiment, the process for generating a second navigation bar for different non-consecutive chapters is described in relation to FIG. 2 above.

As depicted in FIG. 9, the first navigation bar is displayed during the playing of the video. The current play position, i.e., play position 1, of the video is at chapter 2 at time marker 2:27 along the video timeline.

While the video is currently at play position 1, a selection is received to display frames from another chapter, such as chapter 4, which is nonconsecutive to the current chapter 2. The selection may be received for time marker 4:46 in chapter 4.

FIGS. 10A-10C are examples of second navigation bars displayed at various timeline locations in the video when a selection is received to display frames from another chapter that is non-consecutive from the current play position and the current chapter. As depicted in FIGS. 10A-10C, a second navigation bar may be displayed at the current/first play position (i.e., chapter 2, time marker 2:27), at the selected/second play position (i.e., chapter 4, time marker 4:46), or both at the first and the second play position. The displayed second navigation bar may include frames of both the current play position as well as the selected play position.

Figure 11:
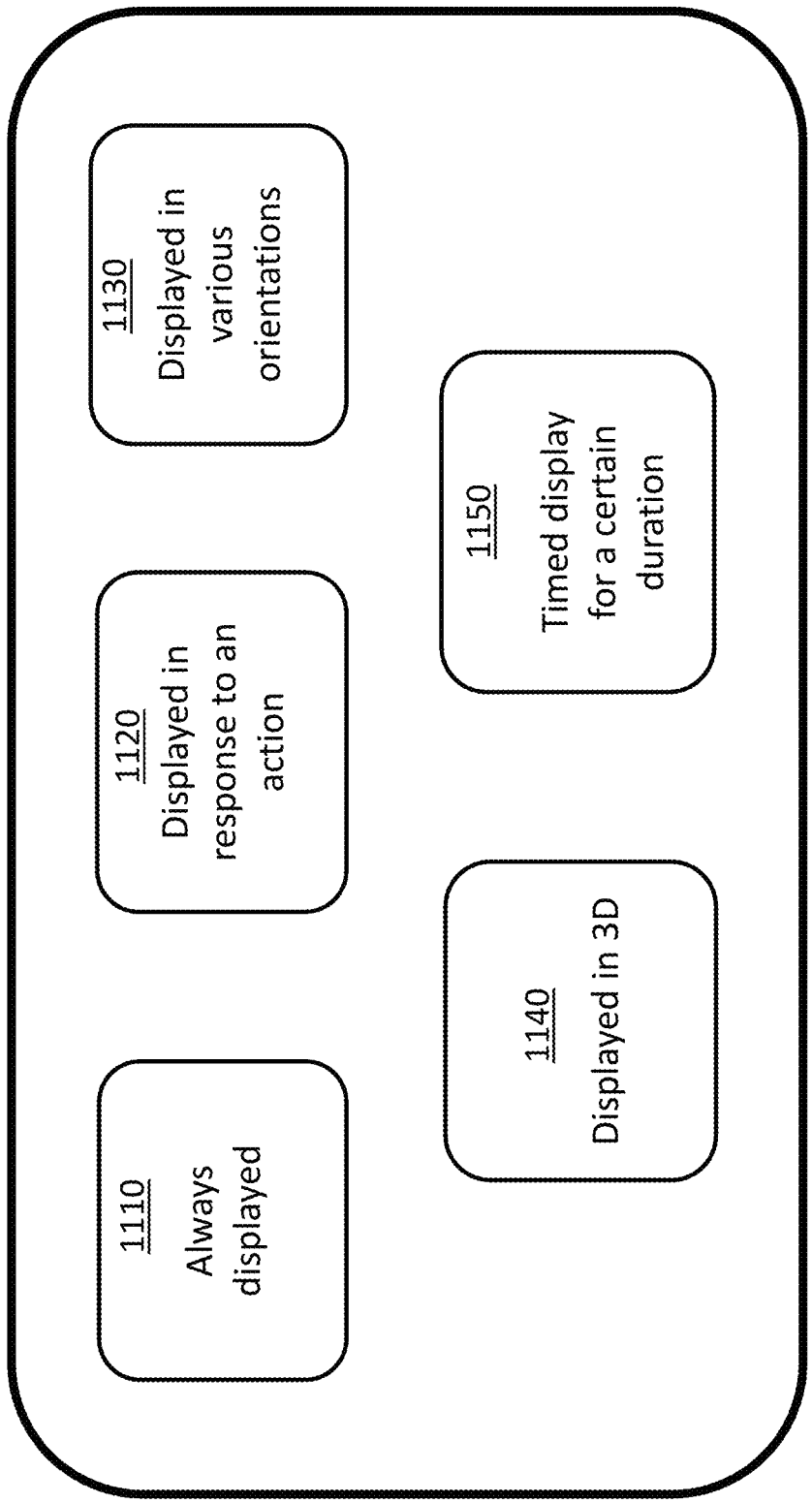
FIG. 11 is a block diagram of display formats and ON/OFF triggers that can be configured for the second navigation bar, in accordance with some embodiments of the disclosure.

FIG. 11 is a block diagram of display formats and ON/OFF triggers that can be configured for the second navigation bar, in accordance with some embodiments of the disclosure. In one embodiment, as displayed in block 1110, the second navigation bar may be displayed at all times when the video is being displayed and/or 1st navigation bar is being displayed.

In another embodiment, as depicted in block 1120, the control circuitry, such as the control circuitry 320 of server 302, may configure the second navigation bar to be displayed in response to an action received. As described earlier, the action, or interaction with the video player or the display interface, may include hovering, touch, gaze, zoom or pinch, double tapping, or any other interaction between the user and the display interface come on such as moving the cursor over remote control.

In another embodiment, As depicted in blocks 1130 and 1140, the second navigation bar may be displayed in various orientations including in a 3D environment.

In yet another embodiment, the second navigation bar may include a timer which is set by the control circuitry 320 for a predetermined duration of time. The control circuitry may determine if the user has interacted either with the display interface or with the second navigation bar prior to the expiration of the timer. If no interaction has been received prior to the expiration of the timer, then the control circuitry may automatically stop displaying the second navigation bar. Doing so may allow a viewer 2 clearly visualize the display on the display interface such that it is not cluttered with navigation bars when it is not needed.

FIG. 12 is a block diagram of various time intervals that can be configured for the second navigation bar, in accordance with some embodiments of the disclosure. As described earlier and depicted in block 1210, the length, span, duration, or interval of the second navigation bar may be dependent on the percentage of the overall video length. As depicted in block 1220, the user or system may also develop a formula or divide the entire video timeline into and equal size number of temporal points which are used in determining the length of the second navigation bar.

In another embodiment, as depicted in block 1230, the control circuitry 320 may determine the length of the navigation bar based on the scene, segment, or chapter that it will be covering. For example, as described earlier in relation to the example in FIG. 7, the length of the second navigation bar may be at least as long as the start and end of a particular scene, segment or chapter. Since the scene, segment, or chapter may vary in length at different parts of the video, the second navigation bar for each scene, segment, or chapter may also vary in length (as depicted in block 1240). For example, a second navigation bar generated at chapter 1 may include 30 frames while a second navigation bar generated at chapter 4 May include 63 frames. In yet another embodiment, as depicted in block 1250, the second navigation bar may be set to a predefined length for each point of the first navigation bar regardless of the chapter or scene it is covering.

Figure 13:
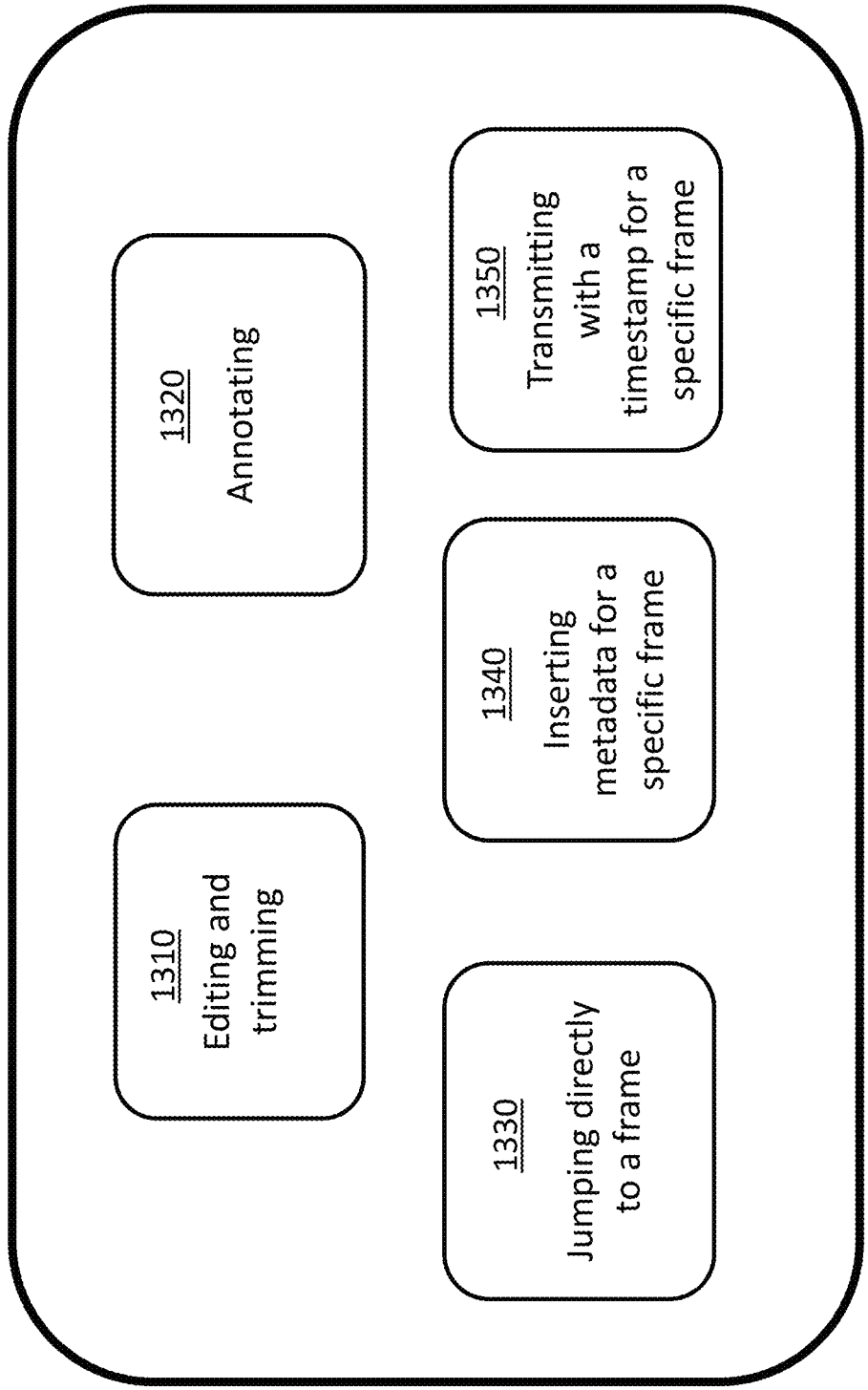
FIG. 13 is a block diagram of various processing options that can be performed based on the second navigation bar, in accordance with some embodiments of the disclosure.

FIG. 13 is a block diagram of various functions that can be performed based on the second navigation bar, in accordance with some embodiments of the disclosure. In one embodiment, one of the functions that can be performed because of the generated second navigation bar is editing and trimming the video, as depicted at block 1310, on a frame level. For example, a user my may be able to navigate to a specific frame by scrolling through the second navigation bar. Since the second navigation bar includes a shorter time span than the first navigation bar, the second navigation bar allows slower scrolling from one frame to the next such that a desired frame can be identified and edited or trimmed.

In another embodiment, as depicted at block 1320, another function that can be performed as a benefit of generating the second navigation bar is annotating. The used may be able to navigate to a desired frame and annotate the frame as desired.

In yet another embodiment, as depicted at block 1330, another function that can be performed as a benefit of generating the second navigation bar is jumping directly to a desired frame instead of having to go back and forth when a granular frame level searching bar is not available.

In another embodiment, as depicted at block 1340, another function that can be performed as a benefit of generating the second navigation bar is allowing the user to insert metadata for a specific frame. Unlike older methods that may have metadata for the entire scene but not on a frame level, having the second navigation bar allows the user to insert it on frame level in addition to having metadata for the scene.

In yet another embodiment, as depicted at block 1350, another function that can be performed as a benefit of generating the second navigation bar is transmitting a pinpoint cite or link to a specific frame to another user such that upon the selection of the pinpoint cite or link, the user is taken directly to the specific frame.

Although various processes, functions, and features have been described in relation to FIGS. 1-2, 5A, 5B, and 6-13 using systems of FIGS. 3 and 4, the methods are not so limiting. For example, the methods include displaying a video on a display area of a video interface, generating a first navigation bar for navigating the displayed video, wherein the first navigation bar is configured to cover the temporal extent of the video and allow navigation from a first predetermined point in the video timeline to a second predetermined point, determining a frame-level interval of time for the first predetermined point in the video timeline, wherein the frame-level interval includes a first temporal point that is placed either at or preceding the first predetermined point and a last temporal point that is placed either at or succeeding the first predetermined point, and generating a second navigation bar to cover the determined frame-level interval, wherein the second navigation bar is configured for a frame-by-frame navigation of the displayed video between the first and the last temporal points of the frame-level interval.

In some embodiments, determining the frame-level interval includes determining a total run-time of the displayed video. Once the total run-time is determined, then calculating the frame-level interval based on the total run-time of the displayed video. For example, dividing the total run-time by a fixed length to be used as a frame-level interval or taking some percentage of the total run-time.

In some embodiments, a plurality of temporal points for the frame-level interval are generated. This embodiment includes configuring the second navigation bar such that navigation between any generated temporal points of the plurality of temporal points, such as from one temporal point to the next, is possible.

In some embodiment, each temporal point, from the plurality of temporal points, is associated with a frame of the displayed video.

In some embodiments, multiple frame-level intervals may be generated for the video, such as for the first predetermined point and the second predetermined point. The frame-level intervals associated with each predetermined point may be either of the same length or of different lengths.

In some embodiments, the time of the frame-level interval is shorter than the length of time between the first and the second predetermined point in the video timeline of between two subsequent predetermined points. Keeping the frame-level intervals shorter that the length between any two predetermined points allows frame specific navigation as mentioned above.

In some embodiments, the second navigation bar is generated in response to a navigation selection received for the first navigation bar. In other embodiments, the second navigation bar is generated in response to receiving a predetermined action. For example, some of the predetermined actions may include a) sensing a touch of the display area of the video interface, b) sensing a selection of an object displayed on the video interface, c) detecting hovering of a mouse over the display area of the video interface, d) pinching or expanding of a portion of display in the display area, e) double tapping of a portion of display in the display area, f) receiving an input from a pointing device, and g) detecting that a user's gaze is directed towards the display area. In some embodiments, the pointing device may be a touch screen or a gestural interface.

In some embodiments, the second navigation bar may be displayed on the video interface in in a location vertically offset from the first navigation bar. In other embodiments, the second navigation bar may be displayed on the video interface as overlayed on the first navigation bar. In yet embodiments, the second navigation bar may be displayed on the video interface as a slider on the first navigation bar. In some instances, if the video interface is displayed in a three-dimensional environment, then displayed a different depth plane than the first navigation bar. In some embodiments, the video interface may be associated with a wearable device.

In some embodiments, a time marker or time stamp may be generated for a specific frame displayed using the second navigation bar.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   displaying a video on a display area of a video interface;
   generating a first navigation bar for navigating the displayed video, wherein the first navigation bar is configured to cover a temporal extent of the video and allow navigation from a first predetermined point in a video timeline of the video to a second predetermined point;
   determining a frame-level interval of time for the first predetermined point in the video timeline, wherein the frame-level interval includes a first temporal point that is placed either at or preceding the first predetermined point and a last temporal point that is placed either at or succeeding the first perdetermined point, wherein determining the frame-level interval comprises:
   determining a first attribute of a first frame associated with the first temporal point;
   determining that a second frame, consecutive to the first frame, includes the first attribute, wherein the second frame includes a percentage of the first attribute above a predetermined threshold;
   based at least in part on determining that the second frame incudes the percentage of the first attribute above the predetermined threshold, including a number of consecutive frames following the second frame in the frame-level interval until a last frame that includes the percentage of the first attribute above the predetermined threshold; and
   generating a second navigation bar to cover the determined frame-level interval, wherein the second navigation bar is configured for a frame-by-frame navigation of the displayed video between the first temporal point and the last temporal point of the frame-level interval.

2. The method of claim 1, wherein determining the frame-level interval further comprises:
   determining a total run-time of the displayed video; and
   calculating the frame-level interval based on the total run-time of the displayed video.

3. The method of claim 1, further comprising:
   generating a plurality of temporal points for the frame-level interval; and
   configuring the second navigation bar to allow navigation between any temporal points of the plurality of temporal points.

4. The method of claim 3, wherein each temporal point, from the plurality of temporal points, is associated with a frame of the displayed video.

5. The method of claim 1, wherein length of time of the frame-level interval is shorter than the length of time between the first and the second predetermined point in the video timeline.

6. The method of claim 1, wherein the second navigation bar is generated in response to a navigation selection received for the first navigation bar.

7. The method of claim 1, wherein the second navigation bar is generated in response to receiving a predetermined action, wherein the predetermined action is selected from a group consisting of:
   a) sensing a touch of the display area of the video interface,
   b) sensing a selection of an object displayed on the video interface,
   c) detecting hovering of a mouse over the display area of the video interface,
   d) pinching or expanding of a portion of display in the display area, and
   e) double tapping of a portion of display in the display area,
   f) receiving an input from a pointing device, and
   g) detecting that a user's gaze is directed towards the display area.

8. The method of claim 1, wherein the second navigation bar is displayed on the video interface in a display format selected from a group consisting of a) displayed in a location vertically offset from the first navigation bar, b) displayed as overlayed on the first navigation bar, c) displayed as a slider on the first navigation bar, and d) if the video interface is displayed in a three-dimensional environment, then displayed a different depth plane than the first navigation bar.

9. The method of claim 1, further comprising, generating a plurality of temporal points between the first temporal point and the last temporal point of the frame-level interval, wherein each of the temporal points in the plurality of temporal points are spaced apart by a predetermined length of time.

10. The method of claim 1, further comprising:
    displaying a frame of the video that is within the frame-level interval; and
    receiving an indication of a predetermined action performed on the displayed frame, wherein the predetermined action is selected from a group consisting of editing, viewing, annotating, sharing, and trimming.

11. The method of claim 1, further comprising, jumping from a temporal point in a first chapter, from the non-consecutive chapters, to a temporal point in a second chapter that succeeds the first chapter in the video timeline and is non-consecutive to the first chapter.

12. The method of claim 1, further comprising, displaying the generated second navigation bar at a play position of the video selected from a group of play positions consisting of a) a current play position, b) a selected play position, and c) both at the current play position and the selected play position.

13. The method of claim 1, further comprising, determining the frame-level interval based on scenes in a current chapter and a selected chapter, from two non-consecutive chapters in the video, the determination further comprising:
    determining a number of frames at a current play position that cover a start and end of a scene in the current chapter;
    determining a number of frames at a selected play position in the selected chapter that cover a start and end of a scene in the selected chapter, wherein the selected chapter is a chapter that is non-consecutive to the current chapter at the current play position; and
    allocating a first portion of the second navigation bar to the determined number of frames at the current play position and a second portion of the second navigation bar to the determined number of frames at the selected play position.

14. The method of claim 1, further comprising, ending the frame-level interval, wherein the last frame in the frame-level interval shares the first attribute of the first frame in the frame-level interval.

15. The method of claim 1, wherein the first attribute of the first frame is an object.

16. The method of claim 1, wherein the second navigation bar is generated based at least in part on determining the number of consecutive frames that include the percentage of the first attribute above the predetermined threshold is greater than a minimum number of frames required to generate the second navigation bar.

17. A system comprising:
communications circuitry to access a video; and
control circuitry configured to:
  display the video on a display area of a video interface;
  generate a first navigation bar for navigating the displayed video, wherein the first navigation bar is configured to cover a temporal extent of the video and allow navigation from a first predetermined point in a video timeline of the video to a second predetermined point;
  determine a frame-level interval of time for the first predetermined point in the video timeline, wherein the frame-level interval includes a first temporal point that is placed either at or preceding the first predetermined point and a last temporal point that is placed either at or succeeding the first predetermined point, wherein determining the frame-level interval comprises:
    determining a first attribute of a first frame associated with the first temporal point;
    determining that a second frame, consecutive to the first frame, includes the first attribute, wherein the second frame includes a percentage of the first attribute above a predetermined threshold;
    based at least in part on determining that the second frame includes the percentage of the first attribute above the predetermined threshold, including a number of consecutive frames following the second frame in the frame-level interval until a last frame that includes the percentage of the first attribute above the predetermined threshold; and
  generate a second navigation bar to cover the determined frame-level interval, wherein the second navigation bar is configured for a frame-by-frame navigation of the displayed video between the first temporal point and the last temporal point of the frame-level interval.

18. The system of claim 17, wherein determining the frame-level interval further comprises, the control circuitry configured to:
  determine a total run-time of the displayed video; and
  calculate the frame-level interval based on the total run-time of the displayed video.

19. The system of claim 17, further comprising, the control circuitry configured to:
  generate a plurality of temporal points for the frame-level interval; and
  configure the second navigation bar to allow navigation between any temporal points of the plurality of temporal points, wherein each temporal point, from the plurality of temporal points, is associated with a frame of the displayed video.

20. The system of claim 17, wherein length of time of the frame-level interval is shorter than the length of time between the first and the second predetermined point in the video timeline.

21. The system of claim 17, wherein the second navigation bar is generated by the control circuitry in response to receiving a predetermined action, wherein the predetermined action is selected by the control circuitry from a group consisting of:
  a) sensing a touch of the display area of the video interface,
  b) sensing a selection of an object displayed on the video interface,
  c) detecting hovering of a mouse over the display area of the video interface,
  d) pinching or expanding of a portion of display in the display area, and
  e) double tapping of a portion of display in the display area,
  f) receiving an input from a pointing device, and
  g) detecting that a user's gaze is directed towards the display area.

22. The system of claim 17, further comprising, the control circuitry configured to:
  display a frame of the video that is within the frame-level interval; and
  receive an indication of a predetermined action performed on the displayed frame, wherein the predetermined action is selected from a group consisting of editing, viewing, annotating, sharing, and trimming.

23. The system of claim 17, further comprising, jumping from a temporal point in a first chapter, from the non-consecutive chapters, to a temporal point in a second chapter that succeeds the first chapter in the video timeline and is non-consecutive to the first chapter.

24. The system of claim 17, further comprising, the control circuitry configured to determine the frame-level interval based on scenes in a current chapter and a selected chapter, from two non-consecutive chapters in the video, the determination further comprising:
  the determination further comprising, the control circuitry configured to:
  determine a number of frames at a current play position that cover a start and end of a scene in the current chapter;
  determine a number of frames at a selected play position in the selected chapter that cover a start and end of a scene in the selected chapter, wherein the selected chapter is a chapter that is non-consecutive to the current chapter at the current play position; and
  allocate a first portion of the second navigation bar to the determined number of frames at the current play position and a second portion of the second navigation bar to the determined number of frames at the selected play position.

* * * * *

UNITED STATES PATENT AND TRADEMARK OFFICE
CERTIFICATE OF CORRECTION

PATENT NO. : 12,405,718 B2  
APPLICATION NO. : 17/750916  
DATED : September 2, 2025  
INVENTOR(S) : V. Michael Bove, Jr. and Reda Harb Page 1 of 1

It is certified that error appears in the above-identified patent and that said Letters Patent is hereby corrected as shown below:

In the Claims

Claim 1, Column 19, Line 26, the word "perdetermined" should be --predetermined--.

Signed and Sealed this  
Twenty-first Day of October, 2025

John A. Squires  
*Director of the United States Patent and Trademark Office*